United States Patent
Kunz et al.

(10) Patent No.: US 8,824,410 B2
(45) Date of Patent: Sep. 2, 2014

(54) METHOD FOR OPERATING A NETWORK AND A NETWORK

(75) Inventors: Andreas Kunz, Heddesheim (DE); Hans-Joerg Kolbe, Darmstadt (DE); Gottfried Punz, Dossenheim (DE)

(73) Assignee: NEC Europe Ltd., Heidelberg (DE)

( * ) Notice: Subject to any disclaimer, the term of this patent is extended or adjusted under 35 U.S.C. 154(b) by 72 days.

(21) Appl. No.: 13/582,797

(22) PCT Filed: Mar. 7, 2011

(86) PCT No.: PCT/EP2011/001102
§ 371 (c)(1),
(2), (4) Date: Sep. 28, 2012

(87) PCT Pub. No.: WO2011/107294
PCT Pub. Date: Sep. 9, 2011

(65) Prior Publication Data
US 2013/0016677 A1 Jan. 17, 2013

(30) Foreign Application Priority Data
Mar. 5, 2010 (EP) .................................... 10002278

(51) Int. Cl.
| | | |
|---|---|---|
| H04W 72/04 | (2009.01) | |
| H04W 76/02 | (2009.01) | |
| H04L 29/06 | (2006.01) | |
| H04W 12/02 | (2009.01) | |
| H04W 84/04 | (2009.01) | |

(52) U.S. Cl.
CPC .......... *H04W 76/022* (2013.01); *H04L 63/164* (2013.01); *H04W 12/02* (2013.01); *H04W 84/045* (2013.01)
USPC ........... 370/329; 370/230; 370/401; 370/474; 455/452.2; 709/223

(58) Field of Classification Search
USPC .......... 370/230, 328–338, 401, 392; 455/436, 455/452.2, 453, 416; 709/223
See application file for complete search history.

(56) References Cited

U.S. PATENT DOCUMENTS 6,529,490 B1 * 3/2003 Oh et al. ........................ 370/331
2004/0208199 A1 * 10/2004 Li ................................... 370/474

(Continued)

FOREIGN PATENT DOCUMENTS

| | | |
|---|---|---|
| EP | 2 076 069 A1 | 7/2009 |
| JP | 2009-159608 A | 7/2009 |
| WO | 2011/056439 A1 | 5/2011 |

OTHER PUBLICATIONS

ETSI TISPAN, "Policy Management Overview", 3GPP/BBF Workshop on FMC, FMC100034, Feb. 2010, pp. 1-43.

(Continued)

*Primary Examiner* — Michael Thier
*Assistant Examiner* — Vincelas Louis
(74) *Attorney, Agent, or Firm* — Young & Thompson

(57) ABSTRACT

For allowing a reliable communication between the wireless part and the core network part via the fixed line network a method for operating a network, especially for policy control within the network, is provided, wherein the network includes a mobile network and a fixed line network, wherein the mobile network includes a wireless part and a core network part and wherein the mobile network and the fixed line network cooperate for providing communication between the wireless part and the core network part via the fixed line network. The method is characterized in that information regarding the wireless part will be provided via the mobile network to the fixed line network for controlling the communication within the fixed line network. Further, a corresponding network, preferably for carrying out the above mentioned method is disclosed.

27 Claims, 17 Drawing Sheets

(56) References Cited

U.S. PATENT DOCUMENTS

| | | | |
|---|---|---|---|
| 2008/0062917 A1* | 3/2008 | Oguchi | 370/328 |
| 2008/0146208 A1* | 6/2008 | Ejzak et al. | 455/416 |
| 2008/0267128 A1* | 10/2008 | Bennett et al. | 370/331 |
| 2009/0156213 A1* | 6/2009 | Spinelli et al. | 455/436 |
| 2009/0168788 A1* | 7/2009 | Den et al. | 370/401 |
| 2009/0170524 A1* | 7/2009 | Yoshizawa | 455/453 |
| 2009/0204698 A1* | 8/2009 | Yang | 709/223 |
| 2009/0207843 A1* | 8/2009 | Andreasen et al. | 370/392 |
| 2009/0240795 A1* | 9/2009 | Tsirtsis et al. | 709/223 |
| 2009/0323632 A1* | 12/2009 | Nix | 370/331 |
| 2010/0075692 A1* | 3/2010 | Busschbach et al. | 455/452.2 |
| 2011/0249652 A1* | 10/2011 | Keller et al. | 370/331 |
| 2013/0279329 A1* | 10/2013 | Livanis | 370/230 |

OTHER PUBLICATIONS

International search report dated Jul. 27, 2011 in corresponding PCT/EP2011/001102.

"Telecommunications and Internet Converged Services and Protocols for Advanced Networking (TISPAN); Resource and Admission Control Sub-System (RACS): Functional Architecture", ETSI Standard, European Telecommunications Standards Institute (ETSI), 650, Route Des Lucioles; F-06921 Sophia-Antipolis; France, No. V3.4.0, Jul. 1, 2009, XP014044413, paragraphs [0006]-[6.2.2.11], [6.3]-[6.3.1.3.5].

"Telecommunications and Internet Converged Services and Protocols for Advanced Networking (TISPAN); Analysis on other SDOs work in the area of the RACS architecture; Analysis on the 3GPP PCC Release 7 architecture", May 9, 2007, ETSI Draft; 13TTD482__INPUT_DRAFT_MI2043_PCC, European Telecommunicatoins Standards Institute (ETSI), 650, Route Des Lucioles; F-06921 Sophia-Antipolis; France, p. 1-29, XP014056685, [retrieved on May 9, 2007], paragraphs [0001], [06.1]-[06.2]; figures 1,2.

"3rd Generation Partnership Project; Technical Specification Group Services and System Aspects; Policy and chargin control architecture (Release 9)", 3GPP Standard; 3GPP TS 23.203, 3rd Generation Partnership Project (3GPP), Mobile Competence Centre; 650, Route Des Lucioles; F-06921 Sophia-Antipolis Cedex; France, No. V9.1.0, Jun. 1, 2009, pp. 1-116, XP050363031, paragraphs [0001], [6.1.5].

NEC, "High level analysis of Interworking between fixed NW access and 3GPP domain", 3GPP-BBF Joint Meeting, FMC100014, Feb. 2010, URL: http://www.3gpp.org/ftp/workshop/2010-02-18_FMC_BBF/Docs/FMC100014.zip.

* cited by examiner

METHOD FOR OPERATING A NETWORK AND A NETWORK

The present invention relates to a method for operating a network, especially for policy control within the network, wherein the network is comprising a mobile network and a fixed line network, wherein the mobile network is comprising a wireless part and a core network part and wherein the mobile network and the fixed line network cooperate for providing communication between the wireless part and the core network part via the fixed line network. Further, the present invention relates to a network, wherein the network is comprising a mobile network and a fixed line network, wherein the mobile network is comprising a wireless part and a core network part and wherein the mobile network and the fixed line network cooperate for providing communication between the wireless part and the core network part via the fixed line network.

In other words, the present invention relates to a method for connecting a wireless network to a fixed network for providing voice calls, for example. FIG. 1 shows a typical overall HNB (Home NodeB) system architecture, as foreseen by 3GPP TS 25.467 [1], with some details related to the customer premises equipment and fixed line access.

For this arrangement, resource/QoS (Quality of Service) control for mobile originated or terminated voice calls via a 2G/3G Home NodeB and data is not considered at the moment on the fixed line network access line. The reason is that with IP (Internet Protocol) as transport protocol in the base arrangement of NBs connected to RNCs (Radio Network Controller) (Iu interface), i.e. for a mobile network consisting of macro cells, the combination of over-provisioning and DiffServ was felt enough; when the architecture was designed for the home cell arrangement, i.e. for connection of HNBs to HNB-GWs, no change was applied. It is to be noted that ATM (Asynchronous Transfer Mode) as transport protocol does not apply for HNBs. As a result, in case of insufficient resources on the access line, the HNB might accept a call that cannot be transferred over the DSL (Digital Subscriber Line).

The underlying protocol stacks are depicted in FIG. 2a (user plane) and 2b (control plane). The CS (Circuit Switched) control plane between MSC (Mobile Switching Center) and UE (User Equipment) is also named "NAS (Non-Access Stratum) signaling".

Related to FIGS. 1 and 2a, 2b the following identifiers are used:

| Identification of... | Short name | Comment |
| --- | --- | --- |
| UE | IMSI | Permanent; assigned by susbscription (stored in HSS and USIM) |
|  | TMSI | temporary; assigned by MSC |
| HNB | LHI | Local HNB IP Address, assigned by the CNG |
| CNG | GCI | AN-side CNGIP Address of the CNG |

The resource problem is visualized for the current methods in FIG. 3. The resources are indicated in their typical amount and capacity by "pipes", e.g. radio bearers, Iu tunnels. It can be noted that for the macro NB case the typical limiting resource is the radio link, and that the system should be dimensioned for the average maximum case, e.g. for the busy hour, but excluding the overload situations still possible like on New Years Eve. For the HNB case it will frequently happen that the radio link has more capacity than the backhaul link, since the backhaul link also transports the fixed line services such as IPTV. Thus the Access Network (AN) may potentially constitute a resource bottleneck.

Further relevant state of the art is described within the following references:

[1] 3GPP TS 25.467, "UTRAN architecture for 3G Home Node B (HNB); Stage 2"
[2] 3GPP TS 23.203, "Policy and charging control architecture"
[3] ETSI TS 183 048, "Resource and Admission Control System (RACS); Protocol Signaling flows specification; RACS Stage 3"
[4] ETSI ES 282 003, "Resource and Admission Control Sub-System (RACS): Functional Architecture"
[5] 3GPP TS 24.007, "Mobile radio interface signaling layer 3; General aspects"
[6] 3GPP TS 24.008, "Mobile radio interface Layer 3 specification; Core network protocols; Stage 3"
[7] 3GPP TS 23.228, "IP Multimedia Subsystem (IMS); Stage 2"
[8] NLE NID-153-08, "SIP-based Home Network Control Channel for Remote QoS Control and Remote Services"
[9] 3GPP TS 23.018, "Basic call handling; Technical realization"
[10] Draft ETSI TR 182 031 V<0.0.6> (2010-02), Telecommunications and Internet converged Services and Protocols for Advanced Networking (TISPAN); Remote CPN QoS Control; Study on CPN-RACS Interaction
[11] ITU-T Recommendation Y.2111 Resource and admission control functions in Next generation networks
[12] Broadband Forum technical document WT-134, "Policy Control Framework"
[13] NLE NID 197-08, "Support for locating devices and/or sessions inside a home network through a location local identifier conveyed over SDP"
[14] 3GPP TS 23.172, "Technical realization of Circuit Switched (CS) multimedia service UDI/RDI fallback and service modification; Stage 2"

SUMMARY OF THE INVENTION

It is an object of the present invention to improve and further develop a method for operating a network and an according network for allowing a reliable communication between the wireless part and the core network part via the fixed line network.

In accordance with the invention, the aforementioned object is accomplished by a method comprising the features of claim 1 and by a network comprising the features of claim 29.

According to the invention, a method is characterized in that information regarding the wireless part will be provided via the mobile network to the fixed line network for controlling the communication within the fixed line network.

According to the invention, a network is characterized by means for providing information regarding the wireless part via the mobile network to the fixed line network for controlling the communication within the fixed line network.

According to the invention it has been recognized that it is possible to allow for a very reliable communication between the wireless part and the core network part via the fixed line network by a controlling mechanism for controlling the communication within the fixed line network. Concretely, information regarding the wireless part will be provided via the mobile network to the fixed line network. On the basis of such an information an individual control of the communication can be provided. For example, the resources within the fixed line network could be controlled for providing reliable voice calls via the fixed line network.

Within a preferred embodiment the information could comprise an identifier of one element or more elements of the wireless part. On the basis of such an identifier a control of the communication within the fixed line network is possible in a simple way.

With regard to a very simple proceeding the identifier could be the local IP address of one or more of the elements. Further or alternatively, the identifier could be a port number and/or a domain name where the IP addresses and port numbers are valid. By means of such identifiers a resource reservation within the fixed line network could be easily provided.

Within a concrete embodiment one of the elements could be an HNB or a CNG (Customer Network Gateway). On the basis of identifiers of such elements a reliable communication can be provided from the wireless part to the core network part via the fixed line network.

With regard to a very simple method the information could be provided by the wireless part via the fixed line network to the core network part. Concretely, the information could be tunnelled through the fixed line network in a simple way.

With regard to a very effective cooperation of the parts within the network the information could be provided by interworking between the mobile network and the fixed line network within the control plane.

During a preferred embodiment of the method the fixed line network could locate one or more elements of the wireless part, preferably the CNG and/or HNB. Thus, a reliable control of the communication within the fixed line network is possible.

Within preferred embodiments of the invention different network structures are possible as the basis for performing the operation of the network. Particularly, elements in the core network part can differ so that there are multiple of combinations in terms of deployment options for the operation of the network. Two important elements to this problem in the mobile network are:

IMS Centralized Services (ICS) at the MSC-Server, i.e. incoming CS traffic and signaling is translated into IMS VoIP traffic and SIP signaling.

Policy Control and Charging (PCC, 3GPP TS 23.203 [2]) is taking care of the QoS control in the mobile network For this reason the following four scenarios due to fixed & mobile network deployment options need to be analyzed further:

|  | Mobile Network | |
| --- | --- | --- |
| Scenario | ICS | PCC |
| Scenario 1 | Yes | Yes |
| Scenario 2 | Yes | No |
| Scenario 3 | No | Yes |
| Scenario 4 | No | No |

If an ICS is provided within the mobile network such an ICS could take care that a CS call is anchored in an SCC AS (Service Centralization and Continuity Application Server) in an IMS. Without an ICS a CS call could be anchored in an SCC AS in an IMS by CAMEL (Customised Applications for Mobile networks Enhanced Logic) rerouting.

If a PCC is provided within the mobile network the information could be provided via a connection between a PCRF (Policy Charging and Rules Function) of a PCC of the mobile network and an RACS (Resource Admission Control System) of an RACF (Resource Admission Control Function) of the fixed line network. If no PCC is provided within the mobile network the information could be provided via a connection between an SCC AS of the mobile network and an RACS of an RACF of the fixed line network.

Further, the information could be provided via a connection between an RAN GW (Radio Access Network Gateway) and an RACS or via a connection between an MSC (Mobile Switching Center) and an RACS.

In any case the RACF could reserve resources via an H-RACS (Home-RACS) and/or via an MSAN (Multi Service Access Node) of the fixed line network.

Thus, different structures of mobile networks could be the basis for the inventive method for operating a network.

Within a further concrete embodiment the information could be included in messaging and/or signaling. Such a messaging or signaling could be started by an UE (User Equipment) for initiating a voice call, for example. Thus, a simple transmission method for the information from the wireless part to the core network part of the mobile network is possible.

Within a further preferred embodiment the information could be discovered during session setup or initial attachment to the network. Further concretely, the information could be encoded in a SETUP message. In a very simple way the information could be encoded in the Facility information element of the SETUP message.

Within a further preferred embodiment the information could be inserted in messaging by an HNB. Alternatively, the information could be inserted by an RAN GW. Such an RAN GW could intercept the signaling messages and discover the information. Further, the RAN GW could loop a local and a global IP address through a non-IP based network.

Within another preferred embodiment an RAN GW or MSC could snoop signaling traffic, preferably a SETUP message, to derive the information. On the basis of such information an appropriate request to the fixed line network's policy controller could be imposed.

In case an HNB is not directly embedded in a CNG, the CNG could be enabled to locate the HNB.

Regarding a further preferred embodiment an HNB could use only one IPsec (IP security) tunnel for all attached UEs or several IPsec tunnels for transmitting the information through the fixed line network. Further preferred, an HNB aware IPsec tunnel QoS modification mechanism (HAITQMM) for detecting an ongoing session within the same IPsec tunnel could be provided within the mobile network. In this way a very reliable controlling of the communication within the fixed line network can be provided.

Generally, the communication could be controlled with regard to resources and/or QoS policies and/or service-based policies. Particularly, a resource reservation could be implemented per tunnel.

Important aspects of the inventive method and network can be summarized as follows:

The embodiments comprise methods to connect the radio part of wireless networks via fixed networks—belonging to a different or the same operator—to the mobile core network in the control plane, in order to allow for end to end policy and QoS control in fixed-mobile-converged (FMC) use cases, for example a 3GPP case.

While the focus is on control plane interworking for QoS control, the methods described here can be applied also in use cases involving other types of policy control, that benefit from such a control plane interworking such as online charging or mobile firewall settings.

The embodiments comprise the provisioning of information related to the HNB and the CNG towards the fixed network via the mobile network. This information is needed to allow for a policy installation for the requested QoS. This information may consist of, but is not limited to the local IP address of the HNB, the AN-side CNG IP address, the port numbers and the domain names where the IP addresses and port numbers are valid.

The IP addresses of the HNB and the CNG as well as the port numbers and domain names can be encoded in the Facility information element of the SETUP message and are set by the HNB, which intercepts this message from the UE. Also any other CS signaling message [9] sent before the SETUP message by the UE or a new message could be used to carry this information. The use of the SETUP message has the advantage that the encoding of new information would be backwards compatible to the existing NAS signaling and would require only a detection mechanism in the mobile operator network.

In case the CS SETUP message is translated into SIP (Session Initiation Protocol), further INVITE messages in the network, e.g. sent by an MSC-Server enhanced for IMS Centralized Services (ICS) or MGCF (Media Gateway Controller Function) would require a new encoding of the IP addresses and port numbers in the SIP header, preferably with a new private SIP header, e.g. a newly to be defined P-HNB-IP-Address header or in the SDP (Session Description Protocol). This would be an enhancement of existing MSC-Server or MGCF functionality.

For the case that the HNB does not intercept the CS signaling message and does not include this information, the RAN GW as IPSec tunnel endpoint could include this information too, if missing.

Depending on the implementation of the HNB, the HNB could use only one IPsec tunnel for all attached UEs, or several IPSec tunnels, e.g. a separate one for each UE.

This needs to be detected by the mobile operator's core network, i.e. when the CS message with the IP address and port information arrives, the responsible core network node shall be able to determine whether different UEs communicate via the same HNB over the same or a separate IPsec tunnel. This knowledge is important for further QoS handling, since in case all UEs use the same tunnel, the QoS of this tunnel needs to be upgraded and not replaced by the new request. For this purpose a HNB aware IPSec tunnel QoS modification mechanism (HAITQMM), which resides in the node in the mobile network—for example in the MSC or in the RAN GW—responsible for the resource reservation, is needed in order to detect an ongoing session within the same IPsec tunnel based on e.g. IP addresses, port numbers, UE identifiers and/or IPSec tunnel related information from the RAN GW. The HAITQMM provides the correct QoS modification information towards the fixed network, i.e. to the SPDF which requests resources towards the RACS. As an alternative to caching the amount of sessions inside one IPSec Tunnel, the mobile network could request additional bandwidth for an existing fixed-line network flow without the need to know the total amount reserved. This can be left to the RACS.

For mobile terminating calls towards a UE handled on a HNB, the above described mechanism for resource reservation can be a applied too. The only difference is that the HNB has to intercept the CALL CONFIRMED message [9], which is the answer to the SETUP message sent by the MSC-Server to the UE. In this CALL CONFIRMED message, the above described information—consist, but is not limited to the local IP address of the HNB, the AN-side CNG address and the port numbers and the domain name—is encoded inside. Also any other CS signaling message [9] previously sent by the UE could be used to carry this information. Similar to the originating scenario, the mobile operator core node in charge for the resource reservation would initiate the QoS request towards the fixed network. For the terminating case the same mechanism applies to differentiate whether the HNB uses one IPSec tunnel for all calls or more tunnels using the HAITQMM.

In case of a call release, the IPSec tunnel's resource reservation should be downgraded accordingly, i.e. the node in the mobile network responsible for the resource reservation should inform the fixed network to modify the QoS for the tunnel using the HAITQMM.

The fixed-line resource reservation can be implemented per tunnel, e.g. treating each direction as one flow (based on the Layer-3/4 "5-tuple" i.e. source IP address, source port, destination IP address, destination port, protocol) or with higher granularity, e.g. treating the IP flow with the same 5-tuple but different DiffServ markings as separate (sub-) flows.

In case of mid-call services during the CS call, there could be the scenario of adding CS video to an ongoing voice call, resulting in a QoS modification request towards the fixed network. Adding and removing video to a voice call requires that the SCUDIF feature [14] is supported in the UE and the mobile network. In case of such a mid-call service, i.e. a teleservice change of the CS bearer, the HNB or RAN GW includes the above described information and the node in the mobile operator network responsible for the resource reservation needs to initiate QoS modification with the HAITQMM.

Hint on nomenclature within this document: the terms HNB and femto cell/femto access point (FAP) are used synonymously in this document. A list of abbreviations is appended.

BRIEF DESCRIPTION OF THE DRAWINGS

There are several ways how to design and further develop the teaching of the present invention in an advantageous way. To this end it is to be referred to the patent claims subordinate to patent claim 1 on the one hand and to the following explanation of preferred examples of embodiments of the invention, illustrated by the drawing on the other hand. In connection with the explanation of the preferred embodiments of the invention by the aid of the drawing, generally preferred embodiments and further developments of the teaching will we explained. In the drawings

DETAILED DESCRIPTION OF THE PREFERRED EMBODIMENTS

Embodiments of the invention show preferred alternatives to connect the mobile network—either NEs or policy controllers—to the fixed line policy controller, e.g. RACS, incl H-RACS. This includes discovery of elements, endpoints and message exchange.

The embodiments target mechanisms for several scenarios based on the QoS network capabilities of the mobile and fixed network operator. The use of the methods described here is though not limited to QoS policy control. In case the HNB is located behind a CNG, the CNG needs to take care of the QoS towards the HNB in the customer network as well.

Important Features/Technical Effects of the Preferred Embodiments

Allow guaranteed QoS for femto cell traffic in home and via the fixed line networks, not only limited to the mobile network.

Allow to collect all required parameters to request resources from the fixed line network through a generic interface.

Allow for further use of the methods to cover other use cases such as service-based policies, e.g., mobile firewall settings.

Figure 1:
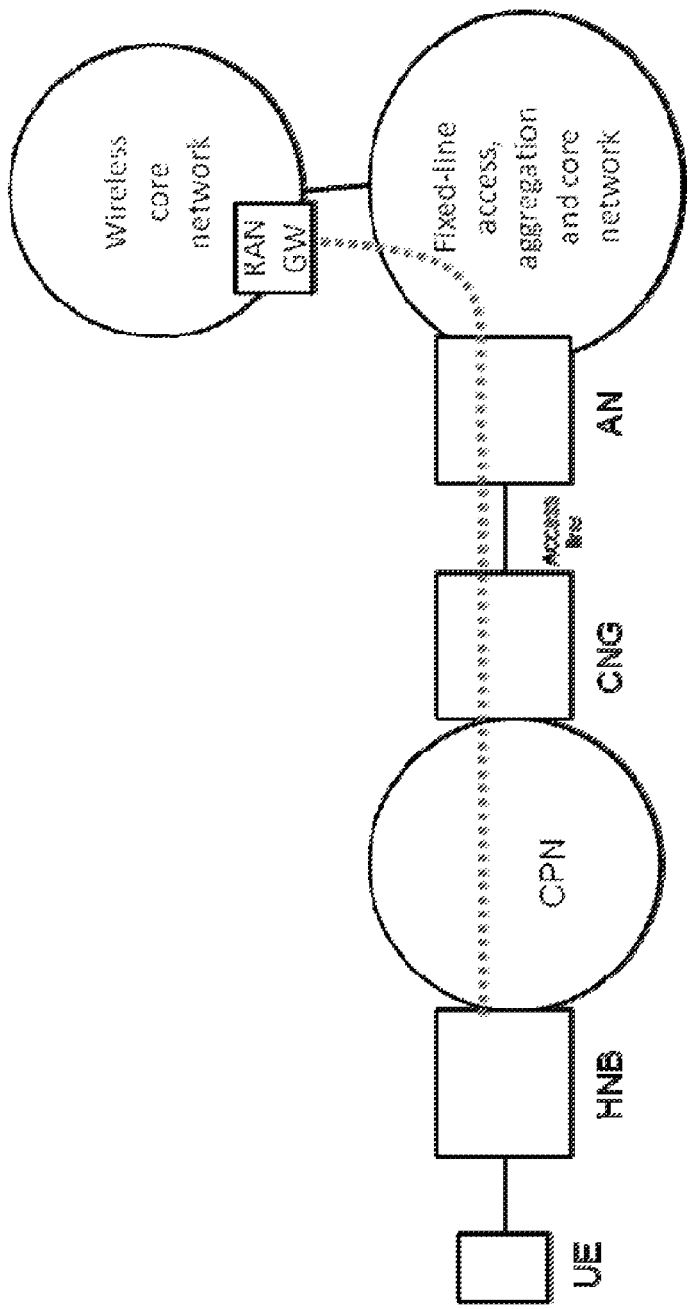
FIG. 1 is showing a conventional HNB system architecture.
Figure 2A:
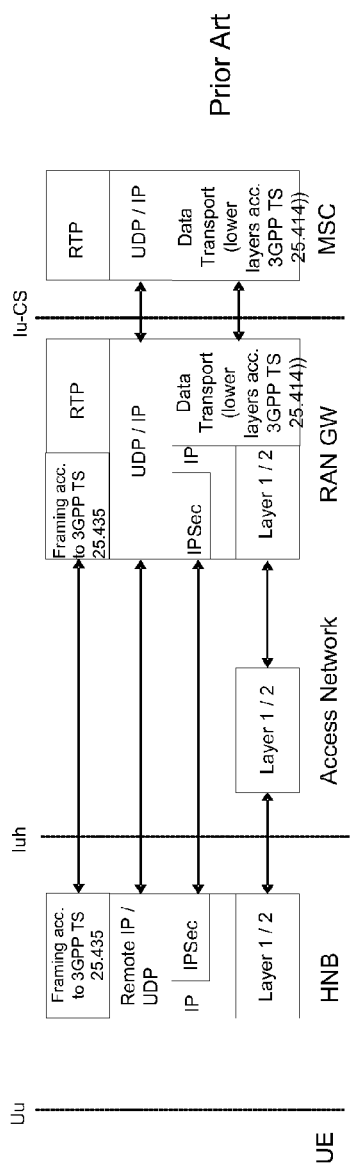
FIG. 2a is showing an example of a conventional underlying user plane protocol stack.
Figure 2B:
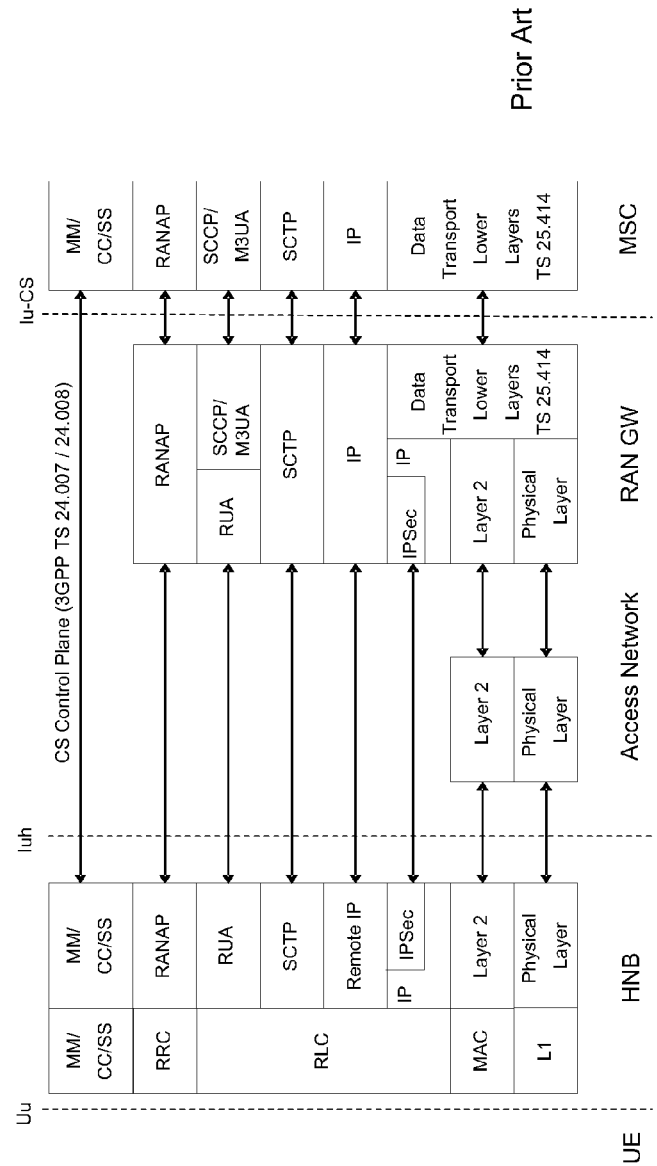
FIG. 2b is showing an example of a conventional underlying control plane protocol stack.
Figure 3:
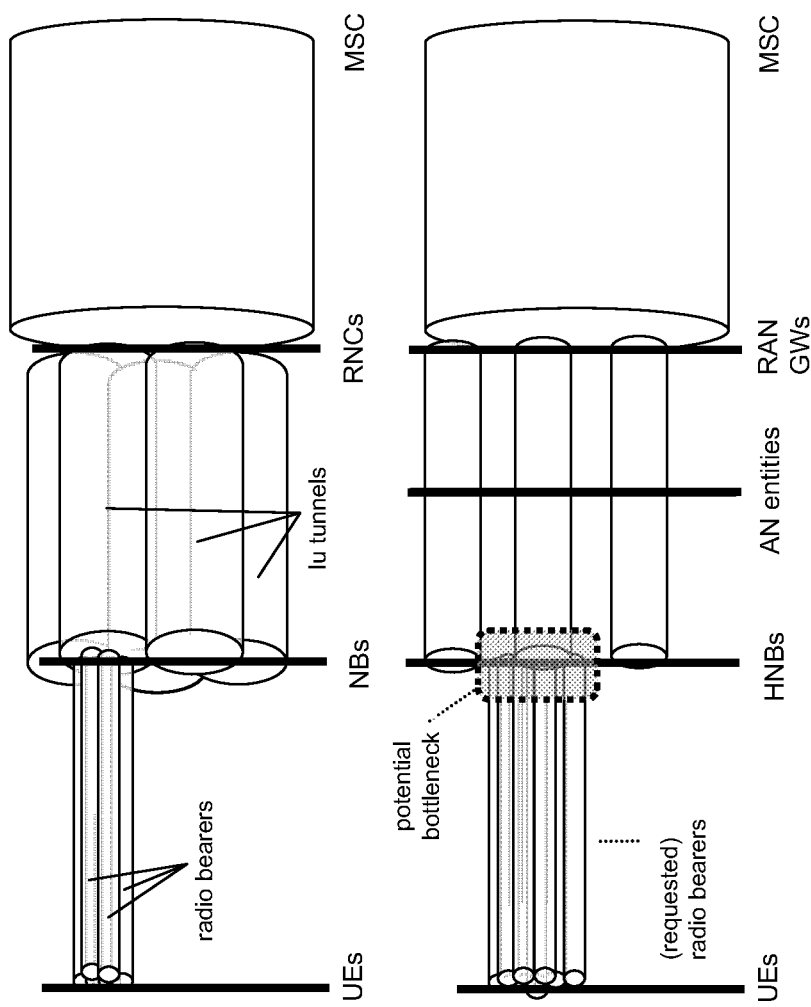
FIG. 3 is showing a conventional resource situation for the cases of a macro NB (upper part) and an HNB (lower part)
Figure 4:
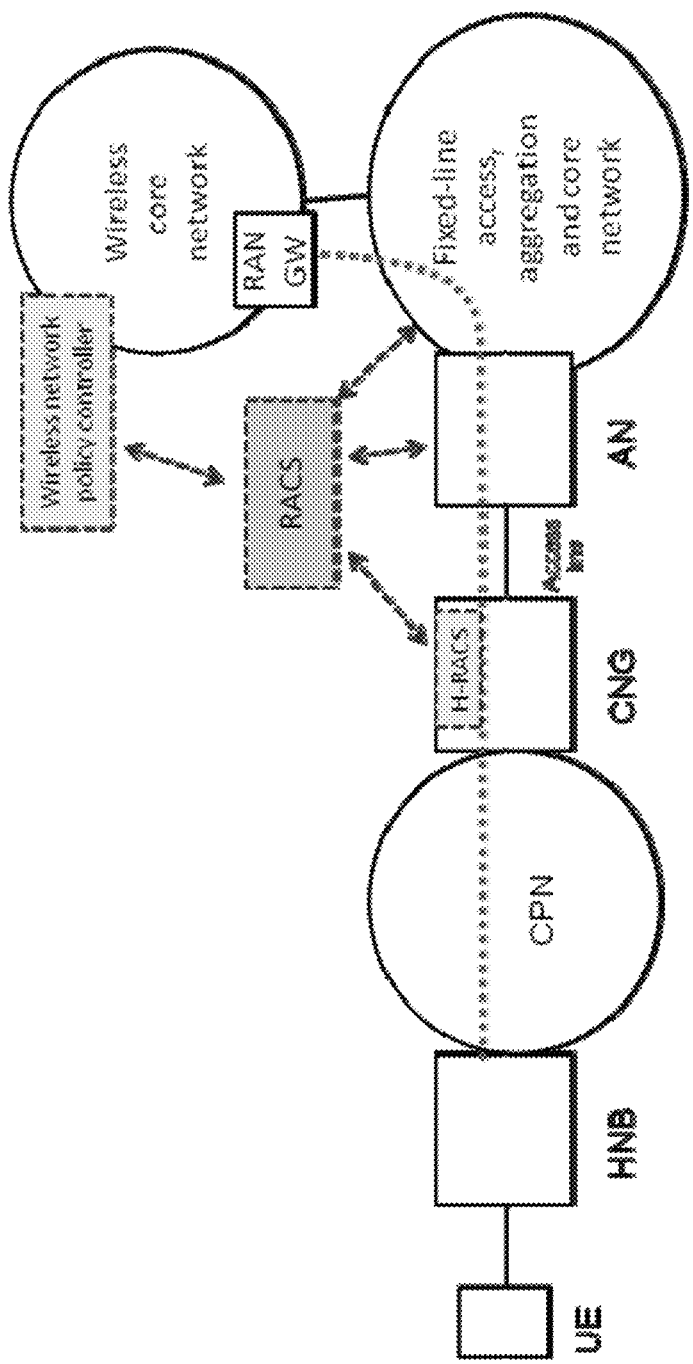
FIG. 4 is showing a preferred embodiment of a network architecture according to the invention in the form of an HNB system architecture enhanced with RACS.

FIG. 4 shows the overall HNB system architecture, as foreseen by 3GPP TS 25.467 [1] and with some details related to the customer premises equipment and fixed line access, enhanced with components for dynamic policy control (shown in grey).

An HNB is connected from the subscriber's home to the mobile operator via an access network of a potentially different fixed network operator; it may be separate from, or co-located with a CNG, i.e. optionally a Customer Premises Network (CPN) may be in place. The HNB is tunneling all CS signaling and CS voice data towards a MSC-Server and a MGW (Media Gateway) in the mobile operator's core network. The fixed network does not know and has no chance to recognize what kind of traffic is routed through the tunnel on the fixed access to the mobile operator, so that there is no resource reservation possible.

Also the different features in the mobile core network can differ so that there are multiple of combinations in terms of deployment options for the mobile operator.

The two most impacting features to this problem in the mobile network are:

IMS Centralized Services (ICS) at the MSC-Server, i.e. incoming CS traffic and signaling is translated into IMS VoIP traffic and SIP signaling.

Policy Control and Charging (PCC, 3GPP TS 23.203 [2]) is taking care of the QoS control in the mobile network.

For this reason the following four possible scenarios due to fixed & mobile network deployment options need to be analyzed further for the solution:

|  | Mobile Network | |
| --- | --- | --- |
| Scenario | ICS | PCC |
| Scenario 1 | Yes | Yes |
| Scenario 2 | Yes | No |
| Scenario 3 | No | Yes |
| Scenario 4 | No | No |

The RACS, specified in ETSI TS 183 048 [3], is the relevant feature for the QoS reservation in the fixed network, i.e. in the DSL and also within the home network in case the HNB is located behind a CNG. Still, this invention is not limited to RACS although all examples focus on RACS. It also applies in similar ways to the ITU-T's RACF, the currently worked on BPCF (Broadband Policy Control Function) architecture of the Broadband Forum or possible future extensions of 3GPP's PCC framework towards fixed line network support.

Figure 5:
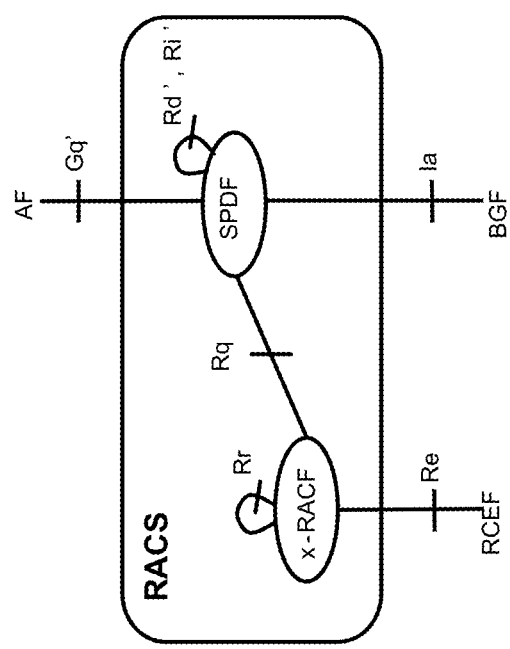
FIG. 5 is illustrating a decomposition of RACS (ETSI ES 282 003 [4])

Depending on the context, individual components of the RACS may be shown in subsequent message flows; for that reason the principal decomposition of RACS is shown in FIG. 5. Reference point Ia is not used in this invention.

The functions of the RAN GW are transparent to the invention described here and thus left out in the message flows.

The above mentioned four scenarios are analyzed further with a corresponding solution description for the use case of originating calls from the UE camping at the HNB. Terminating calls, call release and mid-call services with teleservice changes are using the same principles for interacting with the fixed network for QoS modification:

Scenario 1, Fixed Line Network with RACS and Mobile Network with ICS and PCC

Figure 6:
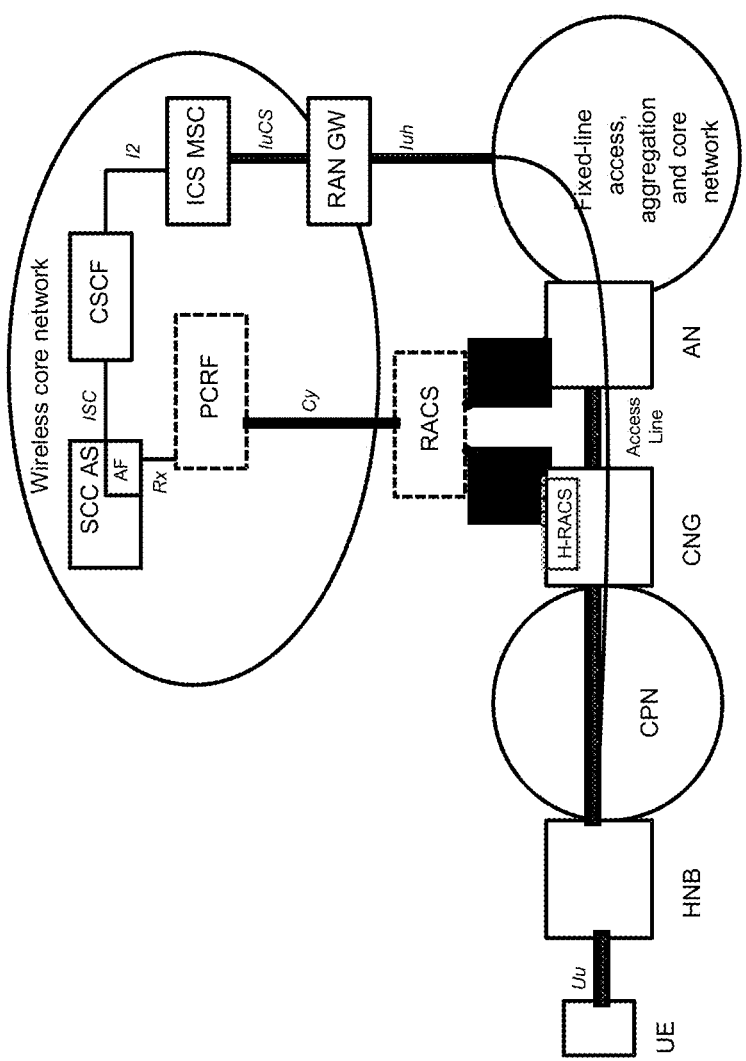
FIG. 6 is showing a further preferred embodiment of a network architecture according to the invention (scenario 1)

In this scenario, which is shown in FIG. 6, ICS takes care that CS call is anchored in the SCC AS in IMS. The SCC AS acts as an Application Function (AF) and provides the application description to the PCRF of PCC.

A new interface Cy connects the PCRF to the RACS in order to provide the combined application service info with the resource reservation request. The H-RACS in the CNG is optional for upstream prioritization. The RACF can either reserve resources via the H-RACS or via the MSAN in the Access Network (AN).

Figure 7:
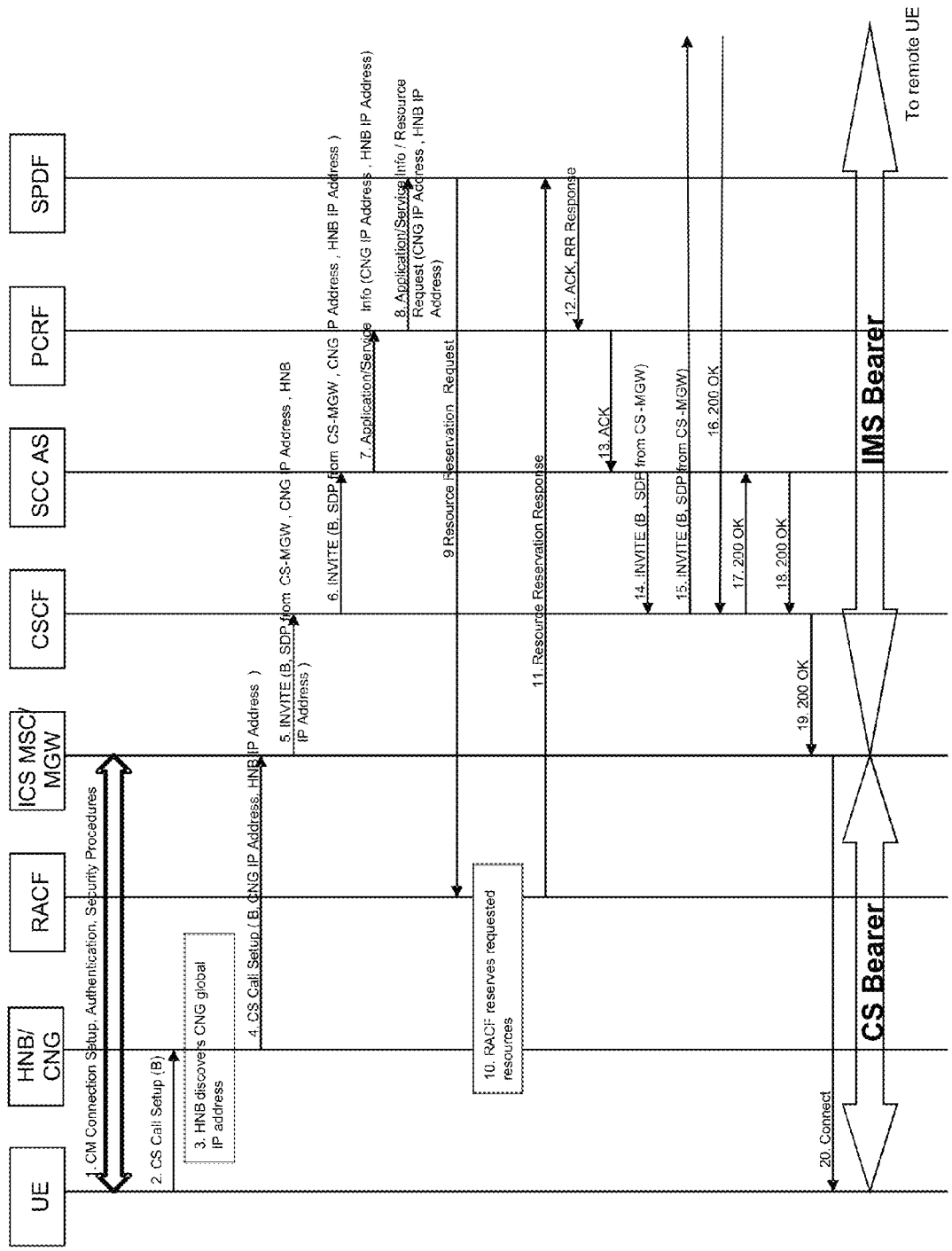
FIG. 7 is showing a call flow for resource allocation in the fixed line access network for scenario 1.

The following flow shows according to FIG. 7 the envisioned call flow to achieve resource reservation on the fixed network access (not all NAS signaling messages are shown here, e.g. ALERT to the UE):

1. The UE performs CS connection setup according to 3GPP TS 24.008 [6], i.e. RRC connection, CM Service request, access control in MSC, optionally authentication by MSC, security context creation/update. As a result a security context for the UE is created/updated.

2. The UE sends a Setup message that contains the Bearer Capabilities of the impeding voice call and the MSISDN of the called party, as per 3GPP TS 24.008 [6].

3. The HNB intercepts the Setup message and discovers the global IP address of the CNG as well as the port number and the domain name used for the HNB signaling traffic. It may have discovered that earlier.

4. The HNB includes the global IP address of the CNG with the port number and the domain name as well as its local IP address in the Setup message towards the MSC-Sever.

NOTE: In case the HNB and the CNG are collocated, see FIG. 6, there is no local HNB IP address and only the AN-side CNG IP address with the port number and the domain name is used in the following steps.

5. The MSC Server sends an INVITE to the S-CSCF with the Request-URI set to the B-party number. If a GRUU is to be included as described in TS 23.228 [7], then include a temporary-GRUU as the contact address if privacy has been requested or a public-GRUU if privacy has not been requested. The INVITE also contains SDP received from the CS-MGW and the global IP address of the CNG with the port number and the domain name as well as the local HNB IP address.

6. The S-CSCF performs standard service control execution procedures. Filter criteria direct the S-CSCF to send the INVITE to the SCC AS. The INVITE still contains the global IP address of the CNG with the port number and the domain name as well as the local HNB IP address.

7. The Application Function in the SCC AS sends the application service description to the PCRF including the global IP address of the CNG with the port number and the domain name as well as the local HNB IP address. The HAITQMM resides either in the SCC AS or in the PCRF in the mobile network in order to detect ongoing session within the same IPsec tunnel and to provide the correct QoS modification information towards the fixed network.

8. The PCRF interfaces with the RACS and generates a Resource Reservation Request, which is send together with the application service description to the SPDF including the global IP address of the CNG with the port number and the domain name as well as the local HNB IP address.

9. The SPDF selects the RACF and sends the Resource Reservation Request with the global IP address of the CNG with the port numbers and the domain names as well as the local HNB IP address.

10. The RACF allocates the requested resources towards the global IP address of the CNG: The CNG can resolve the request based on the local IP address. The CNG answers with a successful resource allocation response.

11. Similarly, when the RACF received the response from the HNB/CNG and thus has confirmation for allocated of the requested resources, it answers to the SPDF with a successful Resource Reservation Response.

12. The SPDF acknowledges the request from the PCRF with a successful Resource Reservation Response.

13. The PCRF acknowledges to the Application Function that the requested resources are reserved.

14. The SCC AS invokes a B2BUA, terminating the UE A Leg and originating the Remote Leg for presentation of an IMS session towards the B-party on behalf of UE A. The SCC AS creates an INVITE containing the SDP received in the CS Bearer Control Signaling Path, indicating CS voice or voice and video media. The INVITE request is routed from the SCC AS to the S-CSCF.

15. The S-CSCF continues with standard IMS originated session processing and routes the request onwards to the B-party.

16.-20. Normal Call Setup completion. The HNB could detect the CONNECT message to close the state machine for the SETUP.

Figure 8:
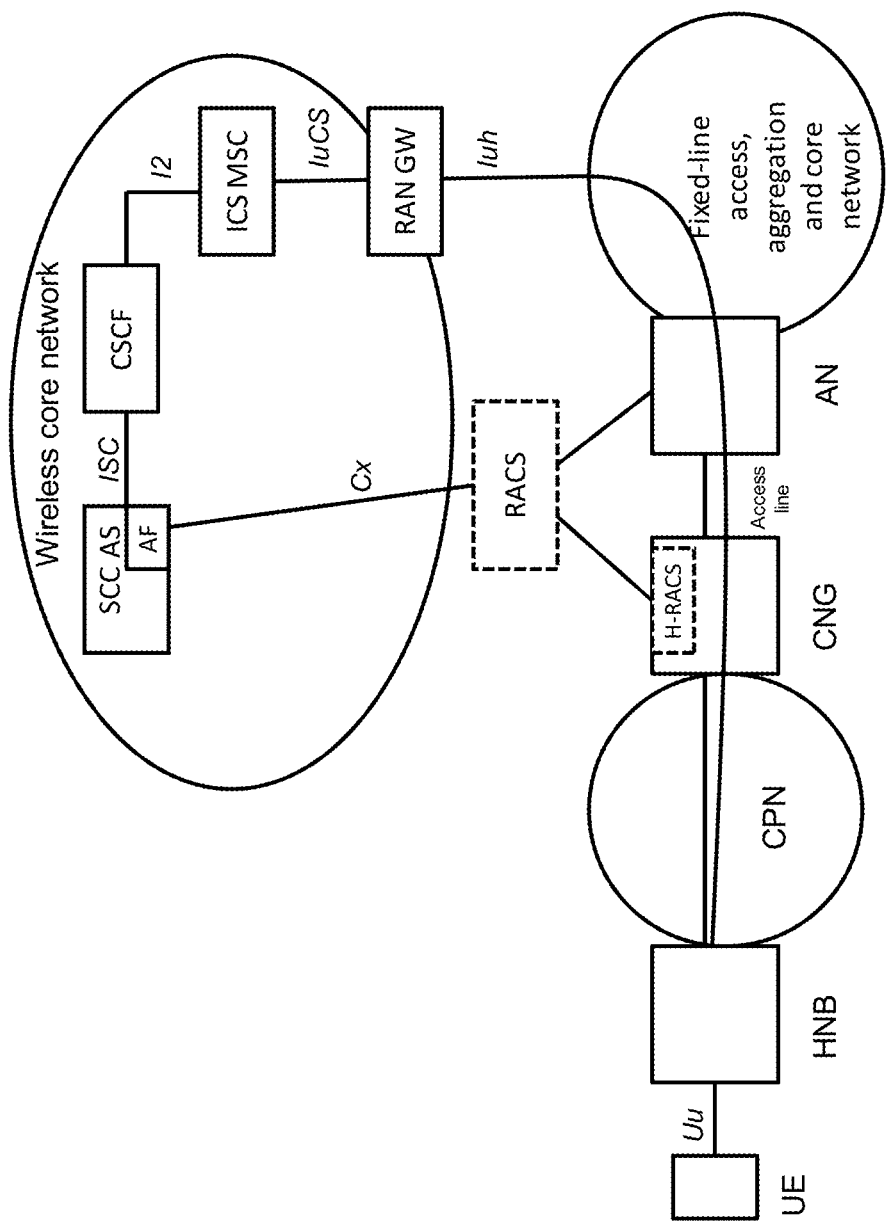
FIG. 8 is showing a further preferred embodiment of a network architecture according to the invention (scenario 2) with separated HNB and CNG.

Scenario 2, Fixed Line Network with RACS and Mobile Network with ICS and without PCC In this scenario, which is shown in FIG. 8, ICS takes care that CS call is anchored in the SCC AS in IMS. The SCC AS acts as an Application Function (AF) and provides the application description. Since this scenario focuses on a non PCC deployment in the mobile operator's network, the SCC AS directly interfaces to the RACS over a new interface Cx in order to provide additionally to the application service info also the resource reservation request. The H-RACS in the CNG is optional for upstream prioritization. The RACF can either reserve resources via the H-RACS or via the MSAN in the Access Network (AN).

Figure 9:
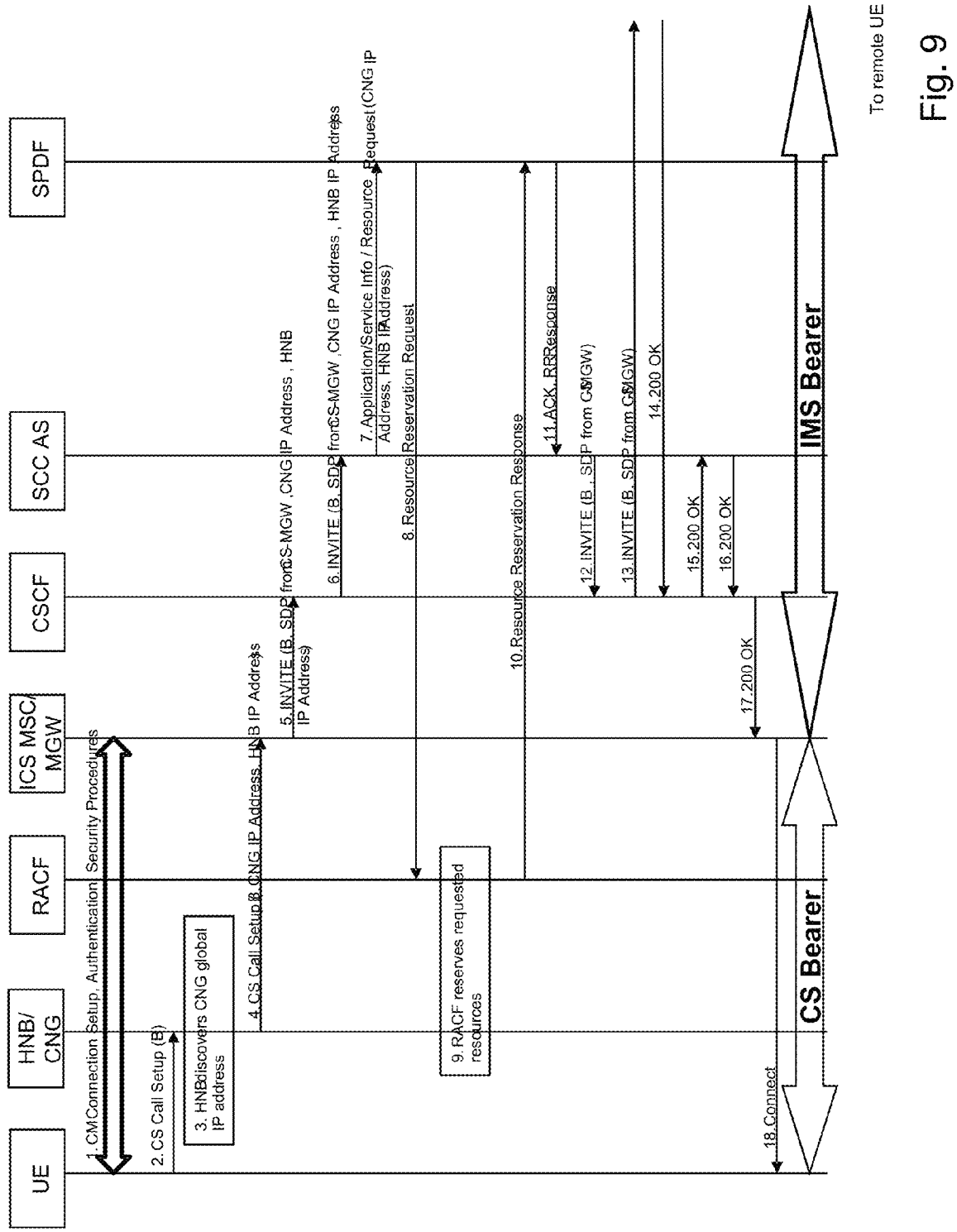
FIG. 9 is showing a call flow for resource allocation in the fixed line access network for scenario 2.

The following flow shows according to FIG. 9 the envisioned call flow to achieve resource reservation on the fixed network access:

1. The UE performs CS connection setup according to 3GPP TS 24.008, i.e. RRC connection, CM Service request, access control in MSC, optionally authentication by MSC, security context creation/update. As a result a security context for the UE is created/updated.

2. The UE sends a Setup message that contains the Bearer Capabilities of the impeding voice call and the MSISDN of the called party, as per 3GPP TS 24.008 [6].

3. The HNB intercepts the Setup message and discovers the global IP address the CNG as well as the port numbers and the domain names used for the HNB signaling traffic. It may have discovered that earlier.

4. The HNB includes the global IP address of the CNG with the port numbers and the domain names as well as its local IP address in the Setup message towards the MSC-Sever.

NOTE: In case the HNB and the CNG are collocated, see FIG. 6, there is no local HNB IP address and only the AN-side CNGIP address is used in the following steps.

5. The MSC Server sends an INVITE to the S CSCF with the Request-URI set to the B-party number. If a GRUU is to be included as described in TS 23.228, then include a temporary-GRUU as the contact address if privacy has been requested or a public-GRUU if privacy has not been requested. The INVITE also contains SDP received from the CS-MGW and the global IP address of the CNG with the port numbers and the domain names as well as the local HNB IP address.

6. The S-CSCF performs standard service control execution procedures. Filter criteria direct the S CSCF to send the INVITE to the SCC AS.

7. The SCC AS acts as an Application Function and as a PCRF so it interfaces with the RACS directly. The SCC AS generates a Resource Reservation Request, which is send together with the application service description to the SPDF. The SCC AS includes the global IP address of the CNG with the port numbers and the domain names as well as the local HNB IP address in the Resource Reservation Request. The HAITQMM resides in the SCC AS in the mobile network in order to detect ongoing session within the same IPsec tunnel and to provide the correct QoS modification information towards the fixed network.

8. The SPDF selects the RACF and sends the Resource Reservation Request.
9. The RACF allocates the requested resources towards the global IP address of the CNG: The CNG can resolve the request based on the local IP address. The CNG answers with a successful resource allocation response.
10. Similarly, when the RACF received the response from the HNB/CNG and thus has confirmation for allocated of the requested resources, it answers to the SPDF with a successful Resource Reservation Response.
11. The SPDF acknowledges the request from the Application Function that the requested resources are reserved.
12. The SCC AS invokes a B2BUA, terminating the UE A Leg and originating the Remote Leg for presentation of an IMS session towards the B-party on behalf of UE A. The SCC AS creates an INVITE containing the SDP received in the CS Bearer Control Signaling Path, indicating CS voice or voice and video media. The INVITE request is routed from the SCC AS to the S CSCF.
13. The S-CSCF continues with standard IMS originated session processing and routes the request onwards to the B-party.
14.-18. Normal Call Setup completion. The HNB could detect the CONNECT message to close the state machine for the SETUP.

Figure 10:
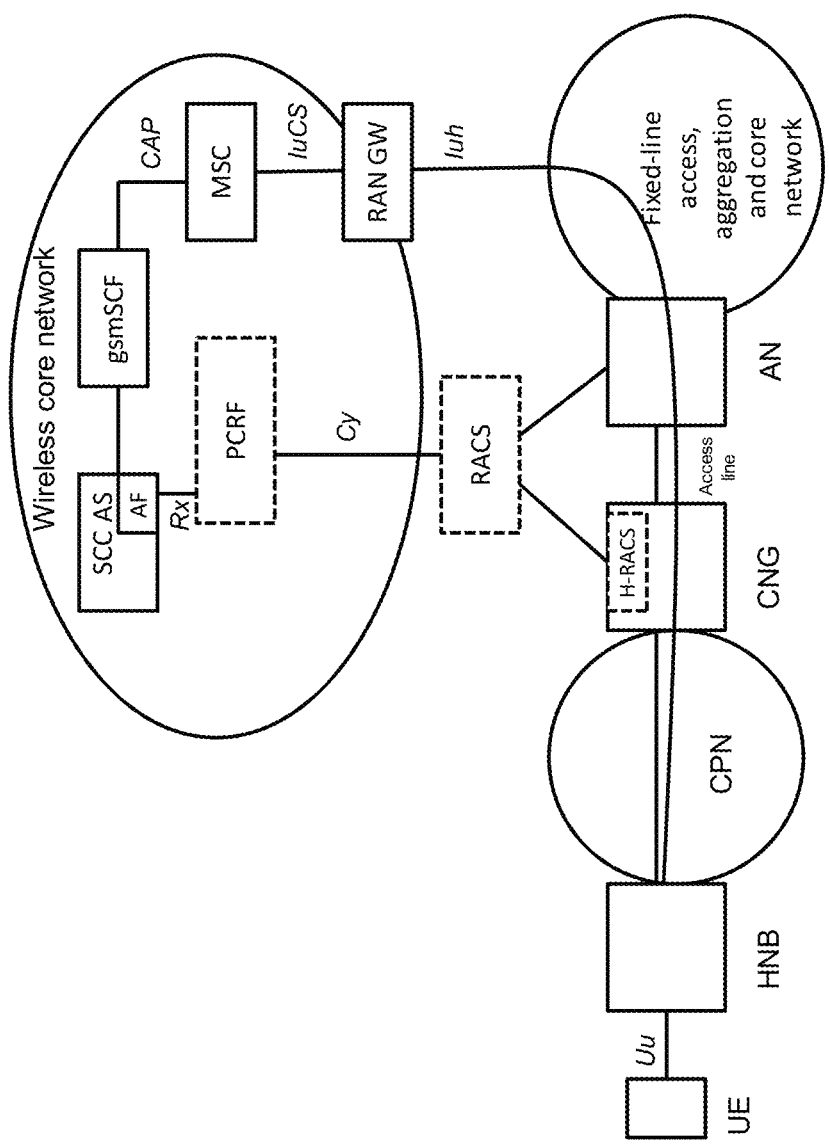
FIG. 10 is showing a further preferred embodiment of a network architecture according to the invention (scenario 3) with separated HNB and CNG.

Scenario 3, Fixed Line Network with RACS and Mobile Network without ICS and with PCC In this scenario, which is shown in FIG. 10, the mobile operator does not have ICS deployed for the MSC-Server but has an IMS. With CAMEL rerouting, the CS call is anchored in the SCC AS in IMS (between gsmSCF and SCC AS the same reference point [not standardized] as for Voice Call Continuity is employed, see 3GPP TS 23.206). The SCC AS acts as an Application Function (AF) and provides the application description to the PCRF. The PCRF interfaces to the RACS over a new interface Cy in order to provide the combined application service info with the resource reservation request. The H-RACS in the CNG is optional for upstream prioritization. The RACF can either reserve resources via the H-RACS or via the MSAN in the Access Network (AN).

Figure 11:
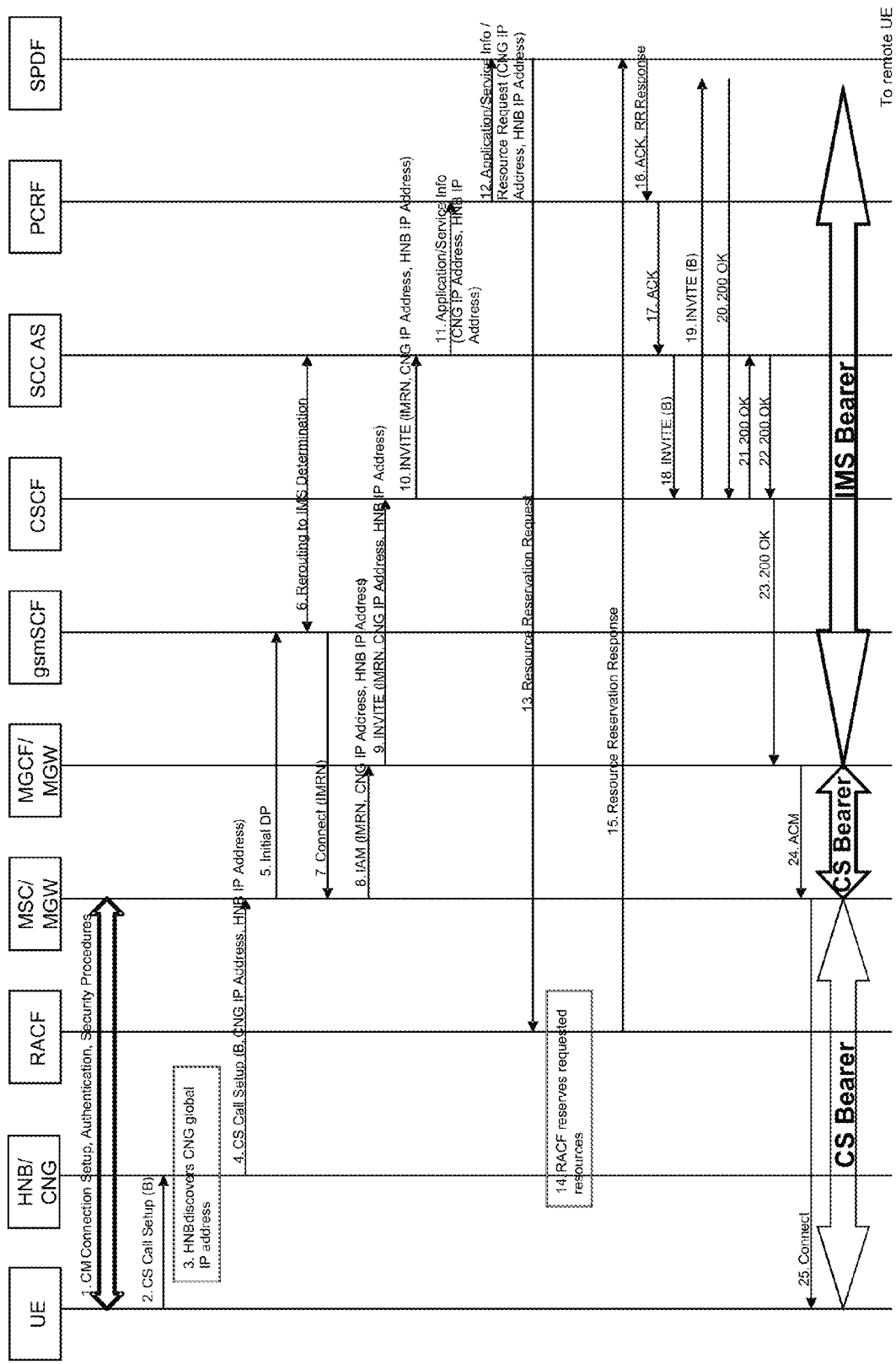
FIG. 11 is showing a call flow for resource allocation in the fixed line access network for scenario 3.

The following flow shows according to FIG. 11 the envisioned call flow to achieve resource reservation on the fixed network access:

1. The UE performs CS connection setup according to 3GPP TS 24.008, i.e. RRC connection, CM Service request, access control in MSC, optionally authentication by MSC, security context creation/update. As a result a security context for the UE is created/updated.
2. The UE sends a Setup message that contains the Bearer Capabilities of the impeding voice call and the MSISDN of the called party, as per 3GPP TS 24.008 [6].
3. The HNB intercepts the Setup message and discovers the global IP address the CNG as well as the port numbers and the domain names used for the HNB signaling traffic. It may have discovered that earlier.
4. The HNB includes the global IP address of the CNG with the port numbers and the domain names as well as its local IP address in the Setup message towards the MSC-Sever.

NOTE: In case the HNB and the CNG are collocated, see FIG. 6, there is no local HNB IP address and only the AN-side CNGIP address is used in the following steps.

5. CAMEL Origination triggers at the MSC are detected; MSC sends an Initial DP message towards the gsmSCF.
6. The gsmSCF invokes the SCC Application's CAMEL Service which determines that the call needs to be rerouted to IMS for SCC; thus, the CAMEL Service reroutes the call to the IMS by returning an IMRN to the gsmSCF; otherwise it responds with a CAP Continue.
7. The gsmSCF responds with a CAP Connect message containing the Original Called party ID and Destination Routing Address. Destination Routing Address contains the IMRN to route the call to the CSAF. Handling of Destination Routing Address and Original Called party ID is as defined in TS 23.078.
8. The MSC routes the call towards the user's home IMS network using the IMRN via an MGCF in the home network including the global IP address of the CNG with the port numbers and the domain names as well as its local IP address in the IAM message.
9. The MGCF initiates an INVITE towards the I-CSCF in the home IMS of the originating call user. The calling party number and/or original called number are included in the INVITE if they are received from the PSTN call setup signaling, e.g., ISUP. The MGCF includes the global IP address of the CNG with the port numbers and the domain names as well as its local IP address in the INVITE message.
10. The I-CSCF routes the INVITE based on one of the following standard procedures specified in "PSI based Application Server termination—direct and PSI based Application Server termination—indirect" procedures in TS 23.228. The S CSCF performs standard service control execution procedures. Filter criteria direct the S CSCF to send the INVITE to the SCC AS, still containing the global IP address of the CNG with the port numbers and the domain names as well as the local HNB IP address.
11. The Application Function in the SCC AS sends the application service description to the PCRF including the global IP address of the CNG with the port numbers and the domain names as well as the local HNB IP address. The HAITQMM resides either in the SCC AS or in the PCRF in the mobile network in order to detect ongoing session within the same IPsec tunnel and to provide the correct QoS modification information towards the fixed network.
12. The PCRF interfaces with the RACS and generates a Resource Reservation Request, which is send together with the application service description to the SPDF including the global IP address of the CNG with the port numbers and the domain names as well as the local HNB IP address.
13. The SPDF selects the RACF and sends the Resource Reservation Request.
14. The RACF allocates the requested resources towards the global IP address of the CNG: The CNG can resolve the request based on the local IP address. The CNG answers with a successful resource allocation response.
15. Similarly, when the RACF received the response from the HNB/CNG and thus has confirmation for allocated of the requested resources, it answers to the SPDF with a successful Resource Reservation Response.
16. The SPDF acknowledges the request from the PCRF with a successful Resource Reservation Response.
17. The PCRF acknowledges to the Application Function that the requested resources are reserved.
18. The SCC AS invokes a B2BUA, terminating the UE A Leg and originating the Remote Leg for presentation of an IMS session towards the B-party on behalf of UE A. The SCC AS creates an INVITE containing the SDP received in the CS Bearer Control Signaling Path, indicating CS voice or voice and video media. The INVITE request is routed from the SCC AS to the S-CSCF.
19. The S-CSCF continues with standard IMS originated session processing and routes the request onwards to the B-party.
20.-25. Normal Call Setup completion. The HNB could detect the CONNECT message to close the state machine for the SETUP.

Figure 12:
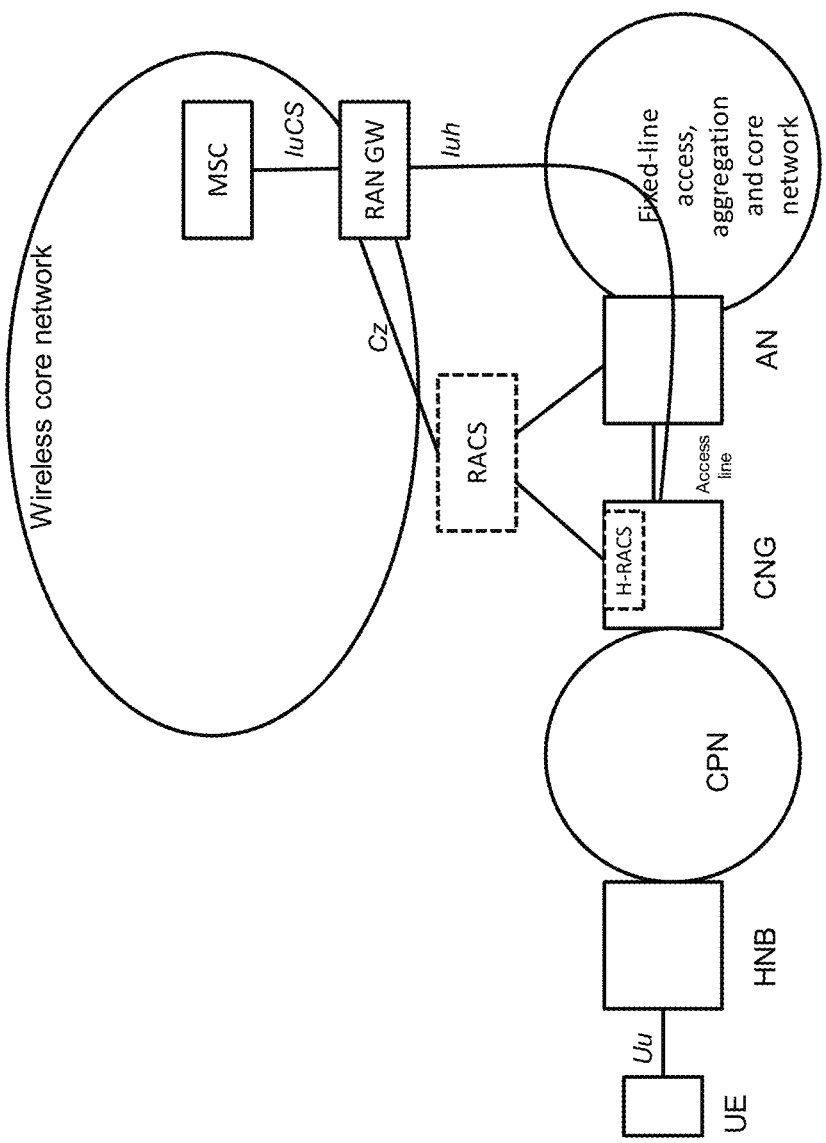
FIG. 12 is showing a further preferred embodiment of a network architecture according to the invention (option 1 of scenario 4) with separated HNB and CNG.
Figure 14:
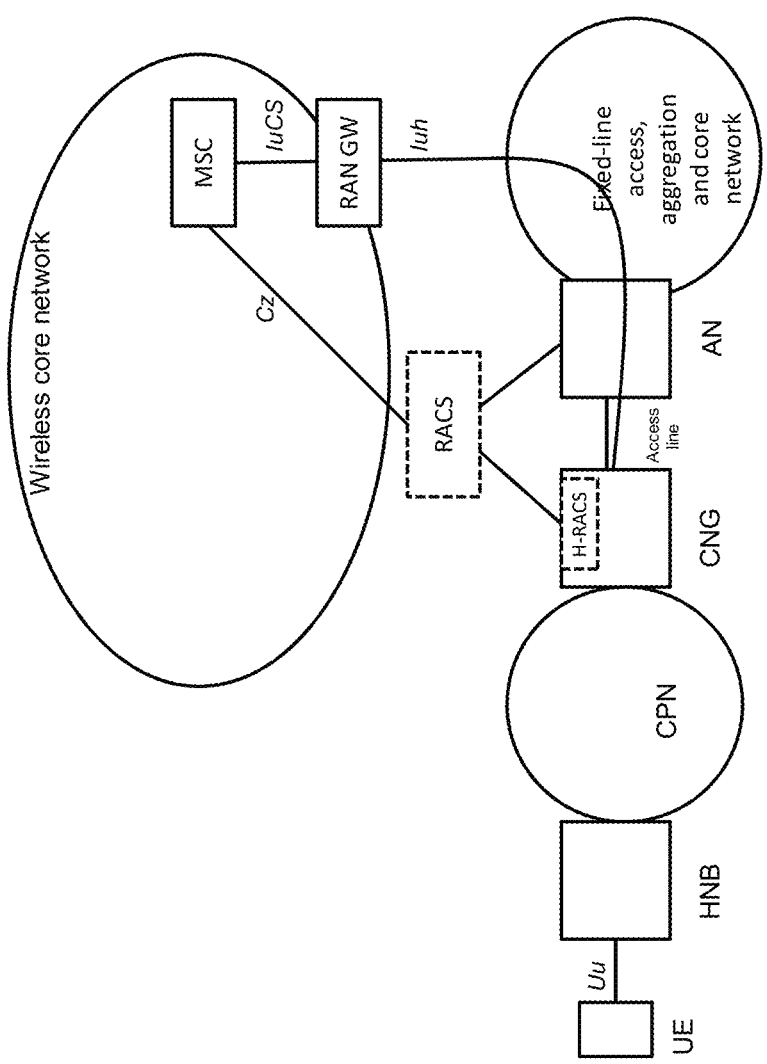
FIG. 14 is showing a further preferred embodiment of a network architecture according to the invention (option 2 of scenario 4) with separated HNB and CNG.

Scenario 4, Fixed Line Network with RACS and Mobile Network Without ICS and Without PCC In this scenario, the mobile operators does not have ICS deployed for the MSC and also does not have PCC for the data traffic. Additionally the operator might not have an IMS so that there is no CAMEL rerouting possible. For this case, two architecture options as envisioned: the RAN GW interfaces with the RACS, see FIG. 12, or the MSC interfaces with the RACS, see FIG. 14, for the resource reservation request.

Option 1: RAN GW intercepts NAS signaling towards the MSC and initiates the resource reservation, see FIG. 12.

Figure 13:
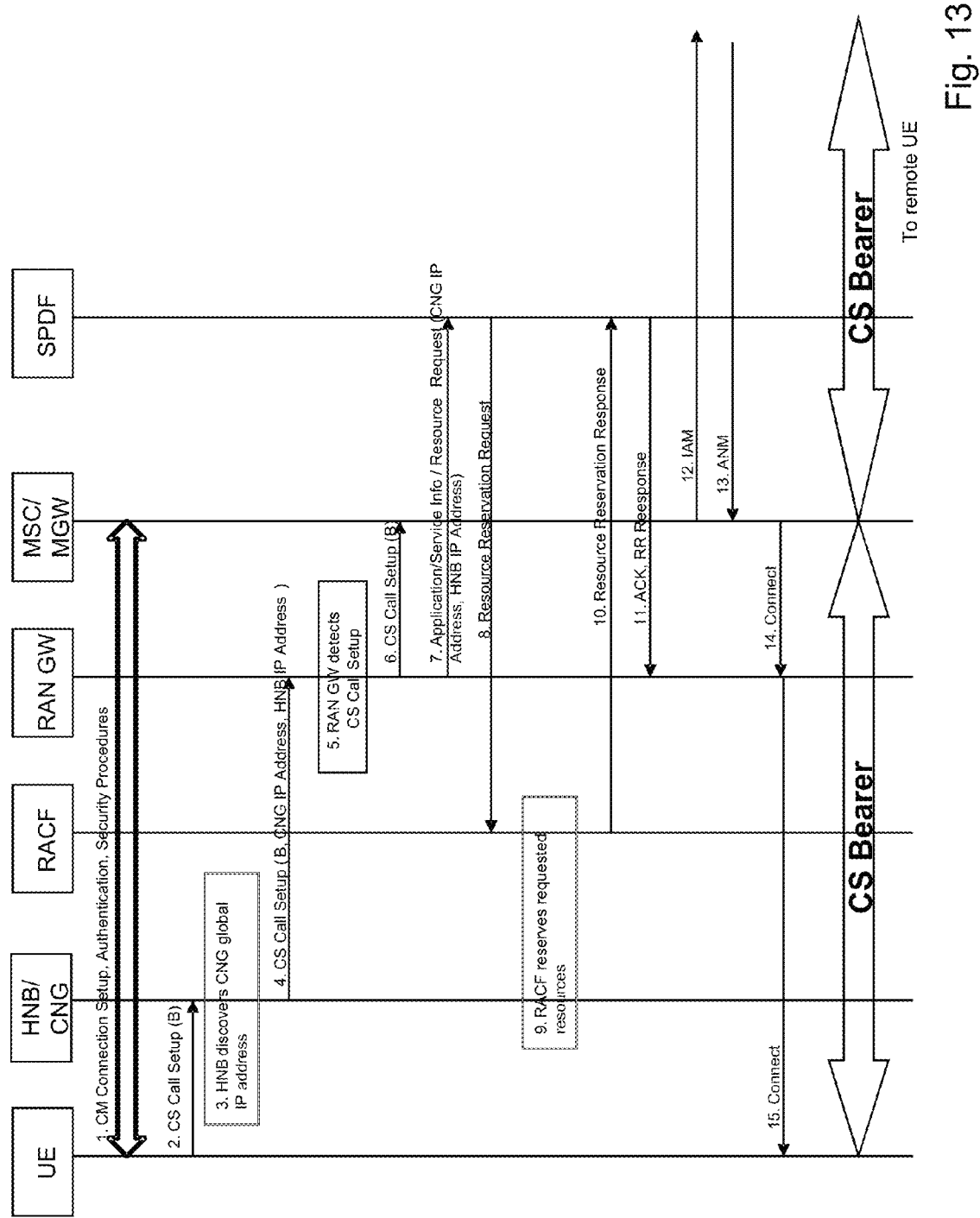
FIG. 13 is showing a call flow for resource allocation in the fixed line access network for option 1 of scenario 4.

The following flow shows according to FIG. 13 the envisioned call flow to achieve resource reservation on the fixed network access:
1. The UE performs CS connection setup according to 3GPP TS 24.008, i.e. RRC connection, CM Service request, access control in MSC, optionally authentication by MSC, security context creation/update. As a result a security context for the UE is created/updated.
2. The UE sends a Setup message that contains the Bearer Capabilities of the impeding voice call and the MSISDN of the called party, as per 3GPP TS 24.008 [6].
3. The HNB intercepts the Setup message and discovers the global IP address the CNG as well as the port numbers and the domain names used for the HNB signaling traffic. It may have discovered that earlier.
4. The HNB includes the global IP address of the CNG with the port numbers and the domain names as well as its local IP address in the Setup message towards the MSC-Sever via the RAN GW.
NOTE: In case the HNB and the CNG are collocated, see FIG. 6, there is no local HNB IP address and only the AN-side CNGIP address is used in the following steps.
5. The RAN GW intercepts the setup message from the UE and detects a voice call setup.
6. The RAN GW forwards the original Setup message from the UE towards the MSC. The HAITQMM resides in the RAN GW in the mobile network in order to detect ongoing session within the same IPsec tunnel and to provide the correct QoS modification information towards the fixed network, Note: it can also hold back this message flow until a successful resource reservation has been confirmed by the SPDF.
7. The RAN GW acts as an Application Function and as a PCRF so it interfaces with the RACS directly. The RAN GW generates a Resource Reservation Request, which is send together with the application service description and the global IP address of the CNG with the port numbers and the domain names as well as its local IP address to the SPDF. This step could occur in parallel to step 7. or before.
8. The SPDF selects the RACF and sends the Resource Reservation Request.
9. The RACF allocates the requested resources towards the global IP address of the CNG: The CNG can resolve the request based on the local IP address. The CNG answers with a successful resource allocation response.
10. Similarly, when the RACF received the response from the HNB/CNG and thus has confirmation for allocated of the requested resources, it answers to the SPDF with a successful Resource Reservation Response.
11. The SPDF acknowledges the request from the RAN GW with a successful Resource Reservation Response.
12. The MSC routes the call towards the remote user's network.
13.-15. Normal Call Setup completion. The HNB could detect the CONNECT message to close the state machine for the SETUP.

Option 2: MSC initiates the resource reservation, see FIG. 14.

Figure 15:
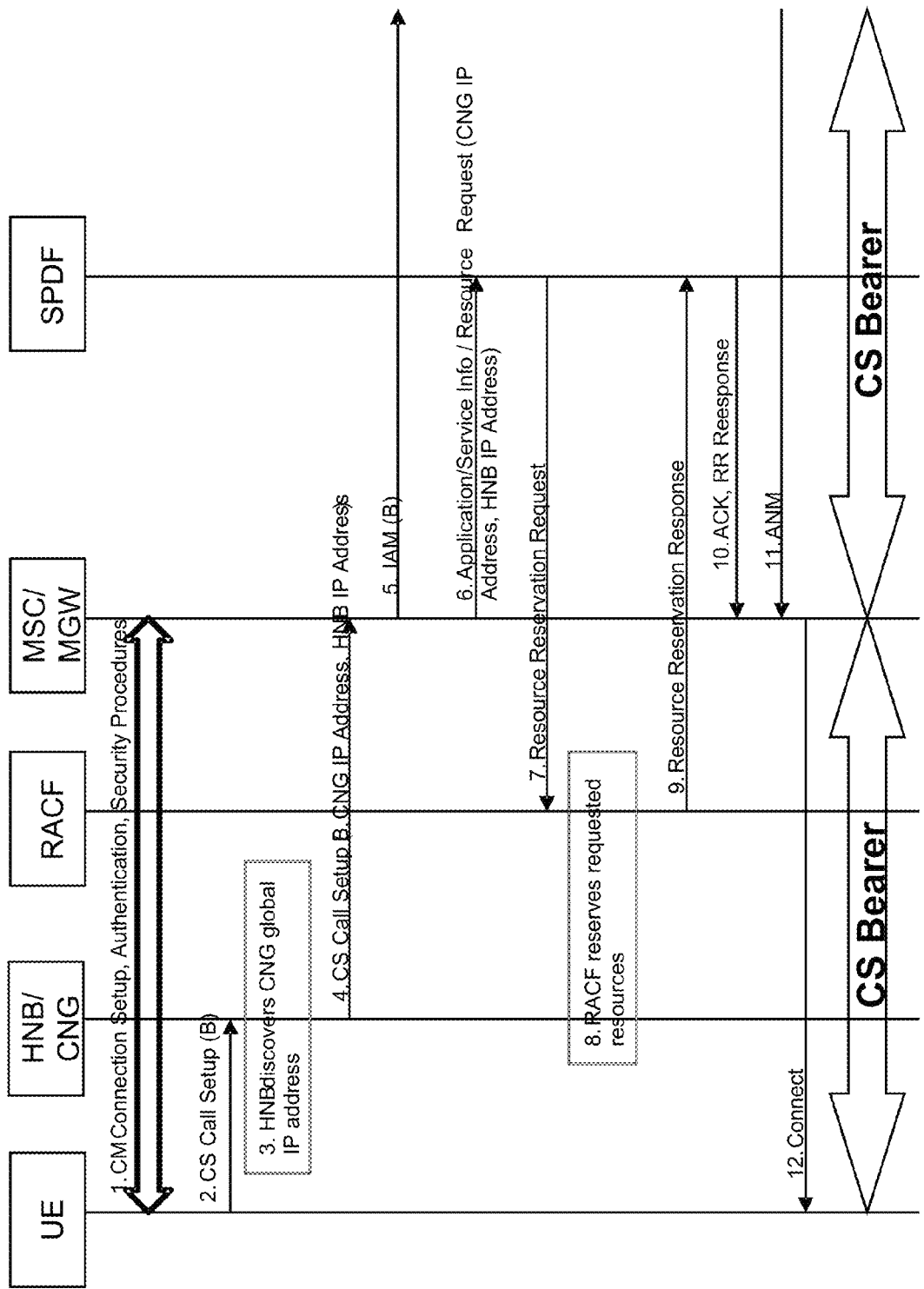
FIG. 15 is showing a call flow for resource allocation in the fixed line access network for option 2 of scenario 4.

The following flow shows according to FIG. 15 the envisioned call flow to achieve resource reservation on the fixed network access:
1. The UE performs CS connection setup according to 3GPP TS 24.008, i.e. RRC connection, CM Service request, access control in MSC, optionally authentication by MSC, security context creation/update. As a result a security context for the UE is created/updated.
2. The UE sends a Setup message that contains the Bearer Capabilities of the impeding voice call and the MSISDN of the called party, as per 3GPP TS 24.008 [6].
3. The HNB intercepts the Setup message and discovers the global IP address the CNG as well as the port numbers and the domain names used for the HNB signaling traffic. It may have discovered that earlier.
4. The HNB includes the global IP address of the CNG with the port numbers and the domain names as well as its local IP address in the Setup message towards the MSC-Sever.
NOTE: In case the HNB and the CNG are collocated, see FIG. 6, there is no local HNB IP address and only the AN-side CNGIP address is used in the following steps.
5. The MSC routes the call towards the remote user's network. Note: it can also hold back this message flow until a successful resource reservation has been confirmed by the SPDF.
6. The MSC acts as an Application Function and as a PCRF so it interfaces with the RACS directly. The MSC generates a Resource Reservation Request, which is send together with the application service description to the SPDF. The MSC includes the global IP address of the CNG with the port numbers and the domain names as well as the local HNB IP address in the Resource Reservation Request. The HAITQMM resides in the MSC-Server in the mobile network in order to detect ongoing session within the same IPsec tunnel and to provide the correct QoS modification information towards the fixed network, This step could occur in parallel to step 5 or before.
7. The SPDF selects the RACF and sends the Resource Reservation Request.
8. The RACF allocates the requested resources towards the global IP address of the CNG: The CNG can resolve the request based on the local IP address. The CNG answers with a successful resource allocation response.
9. Similarly, when the RACF received the response from the HNB/CNG and thus has confirmation for allocated of the requested resources, it answers to the SPDF with a successful Resource Reservation Response.
10. The SPDF acknowledges the request from the MSC with a successful Resource Reservation Response.
11.-12. Normal Call Setup completion. The HNB could detect the CONNECT message to close the state machine for the SETUP.

Figure 16:
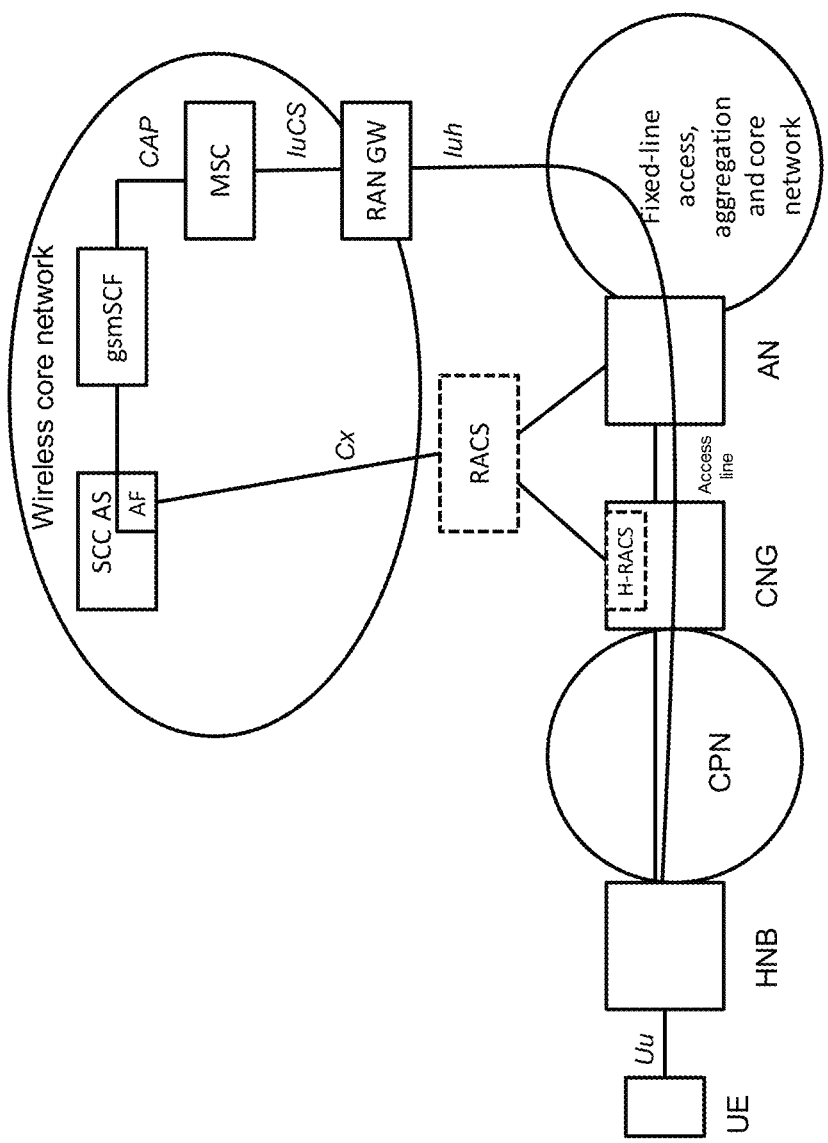
FIG. 16 is showing a further preferred embodiment of a network architecture according to the invention (option 3 of scenario 4) with separated HNB and CNG and FIG. 17 is showing a call flow for resource allocation in the fixed line access network for option 3 of scenario 4.

Option 3: CAMEL rerouting to IMS and SCC AS initiates the resource reservation, see FIG. 16.

In this scenario the mobile operator does not have ICS deployed for the MSC-Server but has an IMS. With CAMEL rerouting, the CS call is anchored in the SCC AS in IMS.

Since this scenario focuses on a non PCC deployment in the mobile operator's network, the SCC AS directly interfaces to the RACS over a new interface Cx in order to provide additionally to the application service info also the resource reservation request. The H-RACS in the CNG is optional for upstream prioritization. The RACF can either reserve resources via the H-RACS or via the MSAN in the Access Network (AN).

Figure 17:
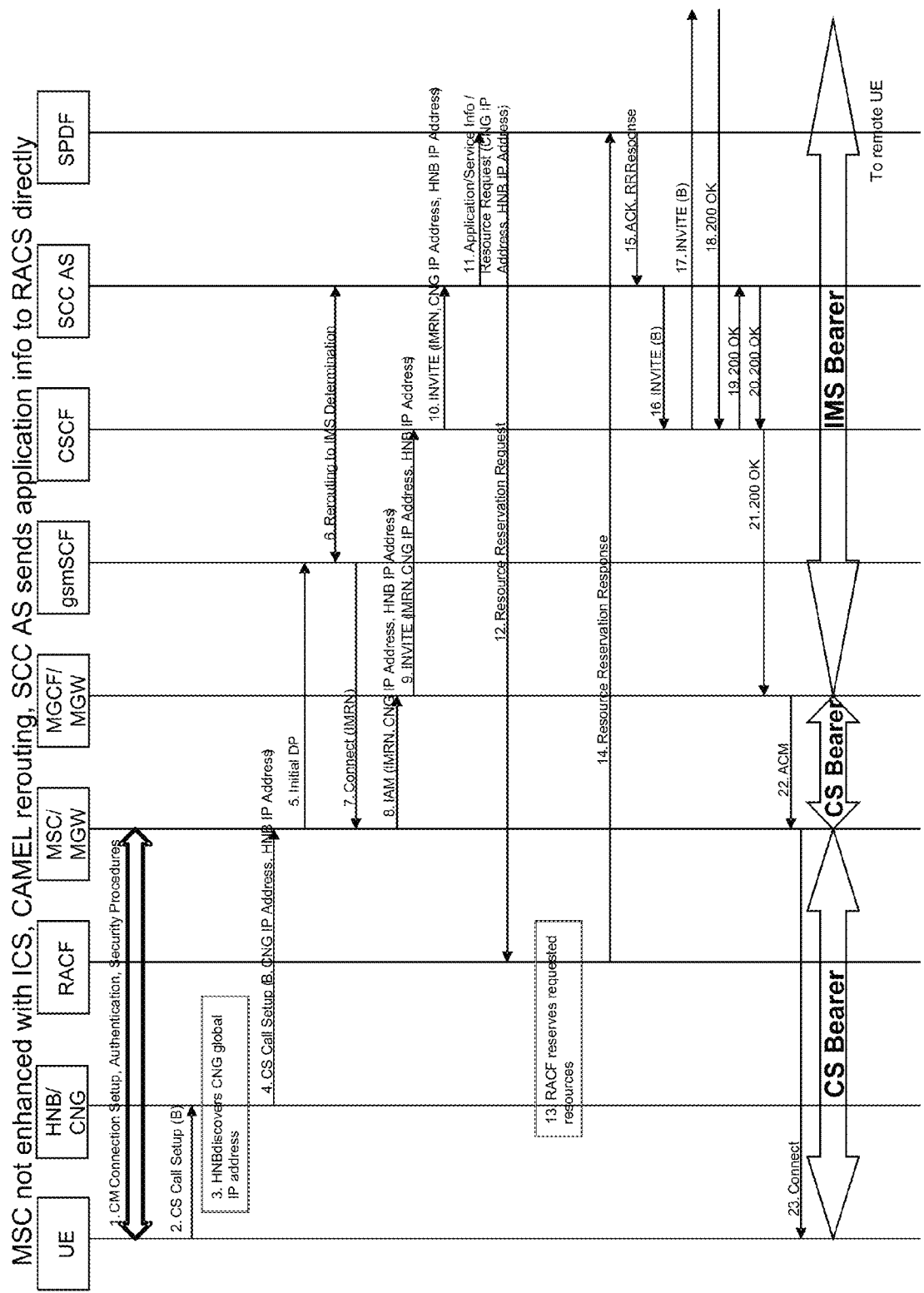

The following flow shows according to FIG. 17 the envisioned call flow to achieve resource reservation on the fixed network access:

1. The UE performs CS connection setup according to 3GPP TS 24.008, i.e. RRC connection, CM Service request, access control in MSC, optionally authentication by MSC, security context creation/update. As a result a security context for the UE is created/updated.
2. The UE sends a Setup message that contains the Bearer Capabilities of the impeding voice call and the MSISDN of the called party, as per 3GPP TS 24.008 [6].
3. The HNB intercepts the Setup message and discovers the global IP address the CNG as well as the port numbers and the domain names used for the HNB signaling traffic. It may have discovered that earlier.
4. The HNB includes the global IP address of the CNG with the port numbers and the domain names as well as its local IP address in the Setup message towards the MSC-Sever.

NOTE: In case the HNB and the CNG are collocated, see FIG. 6, there is no local HNB IP address and only the AN-side CNGIP address is used in the following steps.

5. CAMEL Origination triggers at the MSC are detected; MSC sends an Initial DP message towards the gsmSCF.
6. The gsmSCF invokes the SCC Application's CAMEL Service which determines that the call needs to be rerouted to IMS for SCC; thus, the CAMEL Service reroutes the call to the IMS by returning an IMRN to the gsmSCF; otherwise it responds with a CAP Continue.
7. The gsmSCF responds with a CAP Connect message containing the Original Called party ID and Destination Routing Address. Destination Routing Address contains the IMRN to route the call to the CSAF. Handling of Destination Routing Address and Original Called party ID is as defined in TS 23.078.
8. The MSC routes the call towards the user's home IMS network using the IMRN via an MGCF in the home network including the global IP address of the CNG with the port numbers and the domain names as well as its local IP address in the IAM message.
9. The MGCF initiates an INVITE towards the I-CSCF in the home IMS of the originating call user. The calling party number and/or original called number are included in the INVITE if they are received from the PSTN call setup signaling, e.g., ISUP. The MGCF includes the global IP address of the CNG with the port numbers and the domain names as well as its local IP address in the INVITE message.
10. The I-CSCF routes the INVITE based on one of the following standard procedures specified in "PSI based Application Server termination—direct and PSI based Application Server termination—indirect" procedures in TS 23.228. The S-CSCF performs standard service control execution procedures. Filter criteria direct the S-CSCF to send the INVITE to the SCC AS, still containing the global IP address of the CNG with the port numbers and the domain names as well as the local HNB IP address.
11. The SCC AS acts as an Application Function and as a PCRF so it interfaces with the RACS directly. The SCC AS generates a Resource Reservation Request, which is send together with the application service description to the SPDF. The SCC AS includes the global IP address of the CNG with the port numbers and the domain names as well as the local HNB IP address in the Resource Reservation Request. The HAITQMM resides in the SCC AS in the mobile network in order to detect ongoing session within the same IPsec tunnel and to provide the correct QoS modification information towards the fixed network,
12. The SPDF selects the RACF and sends the Resource Reservation Request.
13. The RACF allocates the requested resources towards the global IP address of the CNG: The CNG can resolve the request based on the local IP address. The CNG answers with a successful resource allocation response.
14. Similarly, when the RACF received the response from the HNB/CNG and thus has confirmation for allocated of the requested resources, it answers to the SPDF with a successful Resource Reservation Response.
15. The SPDF acknowledges the request from the SCC AS with a successful Resource Reservation Response.
16. The SCC AS invokes a B2BUA, terminating the UE A Leg and originating the Remote Leg for presentation of an IMS session towards the B-party on behalf of UE A. The SCC AS creates an INVITE containing the SDP received in the CS Bearer Control Signaling Path, indicating CS voice or voice and video media. The INVITE request is routed from the SCC AS to the S-CSCF.
17. The S-CSCF continues with standard IMS originated session processing and routes the request onwards to the B-party.
18.-23. Normal Call Setup completion. The HNB could detect the CONNECT message to close the state machine for the SETUP.

Important Functions Added to Preferred Embodiments

Local/Global IP Addresses

In order to allow the fixed line network to locate the CNG and HNB, the mobile network needs to provide parameters that allow for this. In the examples above, the HNB has discovered the IP address which the CNG will use for HNB signaling traffic, and its own local IP address in the CPN. In implementations, the HNB can have learned that during network attachment at the CNG e.g. using DHCP options. An alternative can also be the use of STUN procedures, especially in case HNB and CNG are not in the same administrative domain.

As an alternative, the tunnel termination point in the mobile network, i.e. RAN-GW or MSC, depending on use case, can provide this information as follows:

It intercepts the signaling messages and discovers that the IP address embedded in the facility element of the setup messages differs from the source address of the outer IP header of the IP tunnel. Thus, it has both IP addresses that are needed. In this case, the HNB MUST include this facility element.

Important additional procedure according to this invention: It loops a local and a global IP address through a non-IP based network.

Snooping/Store and Forward Function in MSC or RAN GW

The RAN GW or MSC snoops the setup messages to derive the required information—IP endpoints, CPN-local, fixed-line global—and service requirements, such as bandwidth, in order to impose an appropriate request to the fixed line network's policy controller. In case the HNB has not included the required information, e.g., both IP addresses, it can also insert it to the signaling towards nodes further down in the mobile network, when e.g. the MSC connects to the fixed network and not the RAN GW itself.

Identification of the HNB Without Knowing its Local IP Address

In case the HNB is not directly embedded in the CNG, the CNG can still become enabled to locate the HNB. This can be done in the following ways:

- Include source address and port used in the tunnel towards MSC/RAN GW to the interworking with the fixed network policy controller. In an H-RACS request, this can be included and the CNG can then, based on its local NAT table identify the local HNB.
- Do not send any identifier towards the CNG:
- The CNG can check it its local network attachment database, e.g., DHCP repository, for MAC addresses indicating to be a HNB.
- Do not send any identifier towards the CNG. Pre-configuration of the CNG, e.g., by using TR-69 can assist in determining the HNB.
- Traffic pattern detection rules, e.g. by ALGs, in the CNG can identify a femto cell footprint.
- During network attachment, the HNB could identify itself as a HNB.

Depending also on security models, some of those methods may or may not be acceptable to operators. A flag in a resource request towards the CNG can indicate: "this is for the HNB in your network".

Policy Controller Discovery

In case the MSC or RAN GW needs to contact a fixed-line policy controller, it needs to discover the corresponding entry point (single point of contact).

LIST OF ABBREVIATIONS

| AN | Access Network |
|---|---|
| ATM | Asynchronous Transfer Mode |
| CC | Call Control |
| CNG | Customer Network Gateway |
| CPN | Customer Premises Network |
| DSL | Digital Subscriber Line |
| HAITQMM | HNB aware IPSec tunnel QoS modification mechanism |
| HNB | Home Node B |
| H-RACS | Home RACS (RACS for the home NW) |
| ICS | IMS Centralized Services |
| IMSI | International Mobile Subscriber Identity |
| MO | Mobile Originating |
| MSAN | Multi Service Access Node |
| MSC | Mobile Switching Center |
| MT | Mobile Terminating |
| NAS | Non-Access Stratum |
| NB | Node B |
| NE | Network Element |
| NGN | Next Generation Network |
| QoS | Quality of Service |
| RACF | Ressource Addmission Control Function |
| RACS | Ressource Addmission Control System |
| RAN GW | Radio Access Network Gateway |

-continued

| RNC | Radio Network Controller |
|---|---|
| SCC AS | Service Centralization and Continuity Application Server |
| SCUDIF | Service Change and UDI/RDI Fallback |
| SPDF | Service Policy Decision Function |
| TMSI | Temporary Mobile Subscriber Identity |
| UE | User Equipment |

The preferred embodiments provide interworking of a mobile network with a fixed line network in the control plane to allow for policy control required for HNB deployment purposes making use of additional procedures to locate network devices based on identifiers included in messaging.

Further, there is provided a method to insert the identifiers of HNB and CNG by discovering them during session setup or initial attachment and inserting them in the HNB and a method to insert the identifiers of HNB and CNG by discovering them during session setup or initial attachment/service request and inserting them in the RAN GW or MSC.

Moreover, the embodiments can comprise a method to obtain the identifiers of HNB and CNG by snooping signaling traffic at in the RAN GW or MSC. Further, it is shown the transport of IP-endpoint related information through a legacy 2G/3G network by encoding them into the Facility Information Element of the Setup Message.

Within further embodiments the method could be adapted to indicate in policy requests towards the fixed network that the policy is related to a HNB inside a CPN. Further embodiments of the method can locate a HNB inside a CPN based on network attachment repository using HNB flag from the feature mentioned in the preceding sentence. Further, the method can be adapted to locate a HNB inside a CPN based on IP flow footprints and/or based on the IP address and port that was "seen" from the mobile network.

Further important features of embodiments of the invention are:

1) Enabling policy installation requests in fixed line networks and customer premises networks for voice calls
2) Enabling HNB identification/location
3) Enabling guaranteed QoS control for FMC use cases
4) Enabling service-based policy control for mobile services, such as e.g. mobile firewall settings, independent of access technology used Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a network that comprises a mobile network and a fixed line network, the mobile network being comprised of a wireless part and a core network part, and the mobile network and the fixed line network configured to cooperate for providing communication between the wireless part and the core network part via the fixed line network, the method comprising:

providing information regarding the wireless part via the mobile network to the fixed line network for controlling the communication within the fixed line network, wherein an ICS (IMS (IP Multimedia Subsystem) Centralized Services) ensures that a CS (Circuit Switched) call is anchored in an SCC AS (Service Centralization and Continuity Application Server) in an IMS, wherein, where a PCC is provided within the mobile network, the information is provided via a connection between a PCRF (Policy Charging and Rules Function) of the PCC (Policy Control Charging) of the mobile network and an RACS (Resource Admission Control System) of an RACF (Resource Admission Control Function) of the fixed line network, otherwise where a PCC is not provided within the mobile network, the information is provided via a connection between the SCC AS and the RACS of the RACF of the fixed line network, and wherein the information is encoded in a SETUP Non Access Stratum (NAS) message.

2. The method according to claim 1, wherein the information comprises an identifier of one or more elements of the wireless part.

3. The method according to claim 2, wherein the identifier is a local IP address of the one or more elements.

4. The method according to claim 2, wherein the identifier is a port number and/or a domain name where an IP address and the port number are valid.

5. The method according to claim 2, wherein one of the elements is an HNB (Home NodeB) or a CNG (Customer Network Gateway).

6. The method according to claim 5, wherein the CNG is enabled to locate the HNB.

7. The method according to claim 1, wherein the information is provided by the wireless part via the fixed line network to the core network part.

8. The method according to claim 1, wherein the information is provided by interworking between the mobile network and the fixed line network within the control plane.

9. The method according to claim 1, wherein the fixed line network locates one or more elements of the wireless part.

10. The method according to claim 9, wherein the fixed line network locates a CNG and/or an HNB.

11. The method according to claim 1, wherein the CS call is anchored in the SCC AS in the IMS by CAMEL (Customised Applications for Mobile networks Enhanced Logic) rerouting.

12. The method according to claim 1, wherein the information is provided via a connection between an RAN GW (Radio Access Network Gateway) and the RACS.

13. The method according to claim 1, wherein the information is provided via a connection between an MSC (Mobile Switching Center) and the RACS.

14. The method according to claim 1, wherein the RACF reserves resources via an H-RACS (Home-RACS) and/or via an MSAN (Multi Service Access Node) of the fixed line network.

15. The method according to claim 1, wherein the information is included in messaging and/or signaling.

16. The method according to claim 1, wherein the information is discovered during session setup or initial attachment.

17. The method according to claim 1, wherein the information is encoded in a facility information element of the SETUP message.

18. The method according to claim 1, wherein the information is inserted in messaging by an HNB.

19. The method according to claim 1, wherein the information is inserted by an RAN GW.

20. The method according to claim 19, wherein the RAN GW loops a local and a global IP address through a non-IP based network.

21. The method according to claim 1, wherein an RAN GW or MSC snoops signalling traffic to derive the information.

22. The method according to claim 21, wherein the RAN GW or MSC snoops a SETUP message to derive the information.

23. The method according to claim 1, wherein an HNB will use only one IPsec (IP security) tunnel for all attached UEs (User Equipment) or several IPsec tunnels for transmitting the information through the fixed line network.

24. The method according to claim 1, wherein an HNB aware IPsec tunnel QoS modification mechanism (HAITQMM) for detecting an ongoing session within the same IPsec tunnel is provided within the mobile network.

25. The method according to claim 1, wherein the communication is controlled with regard to resources and/or QoS (Quality of Service) policies and/or service-based policies.

26. The method according to claim 1, wherein a resource reservation is implemented per tunnel.

27. A network, comprising:
a mobile network; and
a fixed line network,
wherein the mobile network comprises a wireless part and a core network part, and
wherein the mobile network and the fixed line network cooperate for providing communication between the wireless part and the core network part via the fixed line network,
wherein there is further provided means for providing information regarding the wireless part via the mobile network to the fixed line network for controlling the communication within the fixed line network,
wherein an ICS (IMS (IP Multimedia Subsystem) Centralized Services) ensures that a CS (Circuit Switched) call is anchored in an SCC AS (Service Centralization and Continuity Application Server) in an IMS,
wherein, in the case where a PCC is provided within the mobile network, the information is provided via a connection between a PCRF (Policy Charging and Rules Function) of the PCC (Policy Control Charging) of the mobile network and an RACS (Resource Admission Control System) of an RACF (Resource Admission Control Function) of the fixed line network, and in the case where a PCC is not provided in the mobile network, the information is provided via a connection between the SCC AS and the RACS of the RACF of the fixed line network, and
wherein the information is encoded in a SETUP Non Access Stratum (NAS) message.

* * * * *